United States Patent
Shin et al.

(10) Patent No.: US 11,388,688 B2
(45) Date of Patent: *Jul. 12, 2022

(54) METHOD FOR TRANSMITTING AND RECEIVING SYNCHRONIZATION SIGNAL IN WIRELESS COMMUNICATION SYSTEM AND APPARATUS FOR METHOD

(71) Applicant: LG Electronics Inc., Seoul (KR)

(72) Inventors: Seokmin Shin, Seoul (KR); Hyunsoo Ko, Seoul (KR); Kijun Kim, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/082,757

(22) Filed: Oct. 28, 2020

(65) Prior Publication Data

US 2021/0045078 A1 Feb. 11, 2021

Related U.S. Application Data

(63) Continuation of application No. 16/064,244, filed as application No. PCT/KR2017/010809 on Sep. 28, 2017, now Pat. No. 10,869,286.

(Continued)

(51) Int. Cl.
*H04W 56/00* (2009.01)
*H04J 11/00* (2006.01)

(52) U.S. Cl.
CPC ....... *H04W 56/001* (2013.01); *H04J 11/0073* (2013.01); *H04J 11/0076* (2013.01); *H04J 2211/005* (2013.01)

(58) Field of Classification Search
CPC .... H04J 11/00; H04J 11/0073; H04J 11/0076; H04J 2211/005; H04W 56/001
See application file for complete search history.

(56) References Cited

U.S. PATENT DOCUMENTS

| | | | |
|---|---|---|---|
| 9,350,502 B2 | 5/2016 | Chun et al. | |
| 9,544,083 B2 | 1/2017 | Reddy | |

(Continued)

FOREIGN PATENT DOCUMENTS

| | | |
|---|---|---|
| CN | 101515824 | 8/2009 |
| JP | 2016519477 | 6/2016 |

(Continued)

OTHER PUBLICATIONS

Intel Corporation, "Design on NR DL Synchronization," R1-167705, Presented at 3GPP TSG RAN WG1 Meeting #86, Gothenburg, Sweden, Aug. 22-26, 2016, 7 pages.

(Continued)

*Primary Examiner* — Kashif Siddiqui
(74) *Attorney, Agent, or Firm* — Fish & Richardson P.C.

(57) ABSTRACT

Disclosed are a method for transmitting and receiving a synchronization signal in a wireless communication system and an apparatus therefor. Specifically, a method for performing synchronization signal by transmitting and receiving a synchronization signal includes: receiving, from a base station, a primary synchronization signal (PSS) and a secondary synchronization signal (SSS); and performing synchronization by using the received PSS and the received SSS, in which a sequence for the SSS may be generated by a product between a first sequence and a second sequence and the number of first sequences may be configured to be larger than the number of second sequences.

15 Claims, 10 Drawing Sheets

Related U.S. Application Data

(60) Provisional application No. 62/454,061, filed on Feb. 3, 2017, provisional application No. 62/418,851, filed on Nov. 8, 2016, provisional application No. 62/417,357, filed on Nov. 4, 2016, provisional application No. 62/401,937, filed on Sep. 30, 2016.

(56) References Cited

U.S. PATENT DOCUMENTS

| | | | |
|---|---|---|---|
| 9,609,585 | B1 | 3/2017 | Markovic et al. |
| 10,869,286 | B2* | 12/2020 | Shin .................. H04J 11/00 |
| 2015/0016239 | A1 | 1/2015 | Yi et al. |
| 2018/0123849 | A1 | 5/2018 | Si et al. |
| 2018/0294910 | A1 | 10/2018 | Kim et al. |

FOREIGN PATENT DOCUMENTS

| | | |
|---|---|---|
| JP | 2017517999 | 6/2017 |
| KR | 881169 | 2/2009 |
| KR | 2009131621 | 12/2009 |
| KR | 2013121649 | 11/2013 |
| KR | 1502614 | 3/2015 |
| WO | WO2013015645 | 1/2013 |

OTHER PUBLICATIONS

LG Electronics, "NR Synchronization Signal Design," R1-1702437, Presented at 3GPP TSG RAN WG1 Meeting #88, Athens, Greece Feb. 13-17, 2017, 13 pages.
Office Action in Japanese Appln. No. 2020-073452, dated Jul. 27, 2021, 6 pages (with English translation).
ZTE, "NB-PBCH design for NB-IoT," Rl-160042, Presented at 3GPP TSG RAN WG1 NB-IoT Ad-Hoc Meeting, Budapest, Hungary, Jan. 18-20, 2016, 6 pages.
3$^{rd}$ Generation Partnership Project; NEC, "Discussion on PSS/SSS/PBCH in Numerology Multiplexing," 3GPP TSG RAN WG1, Lisbon, Portugal., dated Oct. 10-14, 2016, 2 pages.
3$^{rd}$ Generation Partnership; Huawei, HiSilicon, "NB-SSS Evaluations," 3GPP TSG RAN WG1, Busan, Korea, Apr. 11-15, 2016, 11 pages.
3$^{rd}$ Generation Partnership; MediaTek Inc., "Secondary Synchronization Signal Design for NB-IoT," 3GPP TSG RAN WG1, St. Julian's, Malta, dated Feb. 15-19, 2016, 5 pages.
Chinese Office Action in Chinese Application No. 201780047491.7, dated Mar. 3, 2020, 15 pages (with English translation).
Extended European Search Report in European Application No. 17856777.2, dated Jan. 27, 2020, 11 pages.
Huawei, HiSilicon, "NB-SSS Design," R1-162627, 3GPP TSG RAN WG1 Meeting #84bis, Busan, Korea, dated Apr. 11-15, 2016, 5 pages.
Huawei, HiSilicon, "Evaluation of NR-SS," R1-1711860, 3GPP TSG RAN WG1 NR Ad Hoc Meeting, Qingdao, China, dated Jun. 27-30, 2017, 5 pages, XP-051306050.
Huawei, HiSilicon, "Finalization of the NR-SSS," R1-1709911, 3GPP TSG RAN WG 1 NR Ad Hoc Meeting, Qingdao, China, dated Jun. 27-30, 2017, 7 pages, XP-051299136.
Intel Corporation, "NB-IoT Secondary Synchronization Signal Design," R1-161896, 3GPP TSG RAN WG1 NB-IoT Ad-Hoc#2, Sophia-Antipolis, France, dated Mar. 22-24, 2016, 5 pages.
Intel Corporation, "Synchronization Signal Sequence Design," R1-1702180, 3GPP TSG RAN WG1 Meeting RAN1 #88, Athens, Greece, dated Feb. 13-17, 2017, 9 pages, XP-51209339.
LG Electronics, "NB-SSS design for NB-IoT," R1-163493, 3GPP TSG RAN WG1 #84is, Busan, Korea Apr. 11-15, 2016, 6 pages.
MediaTek Inc., "Considerations for Synchronization Signals Design in NR Beamformed Initial Access," R1-167526, 3GPP TSG RAN WG1 Meeting #85, Gothenburg, Sweden Aug. 22-26, 2016, 6 pages.
NEC, "Discussion on numerology multiplexing," R1-166637, 3GPP TSG RAN WG1 Meeting #86, Gothenburg, Sweden, dated Aug. 22-26, 2016, 2 pages, XP-051125482.
Nokia Networks, Alcatel-Lucent, Alcatel-Lucent Shanghai Bell, "Synchronization signal design for NB-IoT," R1-161104, 3GPP TSG RAN1 meeting #84, St Julian's, Malta, Feb. 15-19, 2016, 7 pages.
Qualcomm Incorporated, "NB-PSS and NB-SSS Design (Revised)," R1-161981, 3GPP TSG RAN WG1 NB-IoT Ad-Hoc Meeting, Sophia Antipolis, France, dated Mar. 22-24, 2016, 24 pages.
Ericsson, "NB-loT—NSSS Design," R1-161829, Presented at 3GPP TSG RAN WG1 NB-loT Ad-Hoc Meeting, Sophia Antipolis, France, Mar. 22-24, 2016, 3 pages.
MediaTek Inc., "Secondary synchronization signal design for NB-IoT," R1-161946, Presented at 3GPP TSG RAN WG1 NB-IoT Ad-Hoc Meeting, Sophia Antipolis, France, Mar. 22-24, 2016, 5 pages.
Samsung, "Numerology for NR synchronization signal," R1-1609112, Presented at 3GPP TSG RAN WG1 Meeting #86bis, Lisbon, Portugal, Oct. 10-14, 2016, 4 pages.
Office Action in Korean Appln. No. 10-2019-7018238, dated Nov. 22, 2021, 12 pages (with English translation).
Office Action in European Appln. No. 17856777.2, dated Jan. 5, 2022, 7 pages.
Intel Corporation, "NB-IoT Secondary Synchronization Signal Design," R1-162976, Presented at 3GPP TSG RAN WG1 Meeting #84bis, Busan, Korea Apr. 11-15, 2016, 7 pages.
Office Action in European Appln. No. 17856777.2, dated May 4, 2022, 7 pages.

* cited by examiner

METHOD FOR TRANSMITTING AND RECEIVING SYNCHRONIZATION SIGNAL IN WIRELESS COMMUNICATION SYSTEM AND APPARATUS FOR METHOD

CROSS-REFERENCE TO RELATED APPLICATIONS

This application is a continuation of U.S. application Ser. No. 16/064,244, filed on Jun. 20, 2018, now allowed, which is the National Stage filing under 35 U.S.C. 371 of International Application No. PCT/KR2017/010809, filed on Sep. 28, 2017, which claims the benefit of U.S. Provisional Application No. 62/401,937, filed on Sep. 30, 2016, U.S. Provisional Application No. 62/417,357, filed on Nov. 4, 2016, U.S. Provisional Application No. 62/418,851, filed on Nov. 8, 2016, and U.S. Provisional Application No. 62/545,061, filed on Feb. 3, 2017. The disclosures of the prior applications are incorporated by reference in their entirety.

TECHNICAL FIELD

The present invention relates to a wireless communication system, and more particularly, to a method for transmitting and receiving a synchronization signal by a user equipment and an apparatus for supporting the same.

BACKGROUND

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

SUMMARY

This specification proposes a method for transmitting and receiving a synchronization signal in a wireless communication system.

This specification proposes a method for configuring and allocating a sequence of a synchronization signal by considering a subcarrier spacing, a cyclic prefix (CP) length, or a bandwidth applied to the synchronization signal.

More specifically, this specification proposes a method for generating a sequence of a synchronization signal and mapping the generated sequence to a resource region when a subcarrier spacing applied to a synchronization signal (e.g., PSS, SSS) and a default subcarrier spacing are configured to be equal to or different from each other.

Further, this specification proposes a method for generating a sequence (e.g., PSS sequence, SSS sequence) of a synchronization signal used for distinguishing a cell identifier and mapping the generated sequence to a resource region.

The technical objects of the present invention are not limited to the aforementioned technical objects, and other technical objects, which are not mentioned above, will be apparently appreciated by a person having ordinary skill in the art from the following description.

In an embodiment of the present invention, a method for performing synchronization signal by a UE in a wireless communication system includes: receiving, from a base station, a primary synchronization signal (PSS) and a secondary synchronization signal (SSS); and performing synchronization by using the received PSS and the received SSS, in which a sequence for the SSS is generated by a product between a first sequence and a second sequence and the number of first sequences is configured to be larger than the number of second sequences.

Furthermore, in the method according to the embodiment of the present invention, the number of sequences for the SSS may be configured to be equal to the number of cell identifiers.

Furthermore, in the method according to the embodiment of the present invention, the number of cell identifiers may be equal to the product of the number of first sequences and the number of second sequences.

Furthermore, in the method according to the embodiment of the present invention, the product between the first sequence and the second sequence may be the product between each element of the first sequence and each element of the second sequence.

Furthermore, in the method according to the embodiment of the present invention, each of a length of the first sequence and a length of the second sequence may be equal to the length of the sequence for the SSS.

Furthermore, in the method according to the embodiment of the present invention, any one of the first sequence and the second sequence may be an M sequence.

Furthermore, in the method according to the embodiment of the present invention, the M sequence may be generated based on a specific initial value and a specific cyclic shift.

Furthermore, in the method according to the embodiment of the present invention, a polynomial for the sequence for the PSS may be configured to be equal to any one of a first polynomial for the first sequence and a second polynomial for the second sequence.

Furthermore, in the method according to the embodiment of the present invention, when the polynomial for the sequence for the PSS is $x(n)$, $x(0)$ may be 0, $x(1)$ may be 1, $x(2)$ may be 1, $x(3)$ may be 0, $x(4)$ may be 1, $x(5)$ may be 1, and $x(6)$ may be 1, when the first polynomial is $x_0(n)$, $x_0(0)$ is 1, $x_0(1)$ may be 0, $x_0(2)$ may be 0, $x_0(3)$ may be 0, $x_0(4)$ may be 0, $x_0(5)$ may be 0, and $x_0(6)$ may be 0, and when the second polynomial is $x_1(n)$, $x_1(0)$ may be 1, $x_1(1)$ may be 0, $x_1(2)$ may be 0, $x_1(3)$ may be 0, $x_1(4)$ may be 0, $x_1(5)$ may be 0, and $x_1(6)$ may be 0.

Furthermore, in the method according to the embodiment of the present invention, the SSS may be received contiguously with a physical broadcast channel (PBCH) and a cyclic prefix applied to the SS may be configured to be equal to the cyclic prefix applied to the PBCH.

In an embodiment of the present invention, a user equipment (UE) performing synchronization in a wireless communication system includes: a transceiving unit for transmitting and receiving a radio signal; and a processor functionally connected to the transceiving unit, in which the processor controls to receive, from a base station, a primary synchronization signal (PSS) and a secondary synchronization signal (SSS) and perform synchronization by using the received PSS and the received SSS, a sequence for the SSS is generated by a product between a first sequence and a second sequence, and the number of first sequences is configured to be larger than the number of second sequences.

Furthermore, in the UE according to the embodiment of the present invention, the number of sequences for the SSS may be configured to be equal to the number of cell identifiers.

Furthermore, in the UE according to the embodiment of the present invention, the number of cell identifiers may be equal to the product of the number of first sequences and the number of second sequences.

Furthermore, in the UE according to the embodiment of the present invention, the product between the first sequence and the second sequence may be the product between each element of the first sequence and each element of the second sequence.

Furthermore, in the UE according to the embodiment of the present invention, each of a length of the first sequence and a length of the second sequence may be equal to the length of the sequence for the SSS.

Furthermore, in the UE according to the embodiment of the present invention, any one of the first sequence and the second sequence may be an M sequence.

According to an embodiment of the present invention, even when the same subcarrier spacing or different subcarrier spacings are applied to a primary synchronization signal and a secondary synchronization signal, high correlation performance can be maintained.

Further, according to an embodiment of the present invention, when a sequence of a synchronization signal is generated, as not a short sequence but a long sequence is used, a ghost effect can be prevented and cross-correlation performance can be enhanced.

In addition, according to an embodiment of the present invention, when the sequence of the synchronization signal is generated, the numbers of candidates for two different sequences used for the generation are configured to be different from each other (that is, the numbers of candidates of two sequences are configured to be uneven), and as a result, the cross-correlation performance can be enhanced.

Advantages which can be obtained in the present invention are not limited to the aforementioned effects and other unmentioned advantages will be clearly understood by those skilled in the art from the following description.

BRIEF DESCRIPTION OF THE DRAWINGS

The accompanying drawings, which are included herein as a part of a description in order to help understanding of the present disclosure, provide embodiments of the present disclosure, and describe the technical features of the present disclosure with the description below.

DETAILED DESCRIPTION

Figure 1:
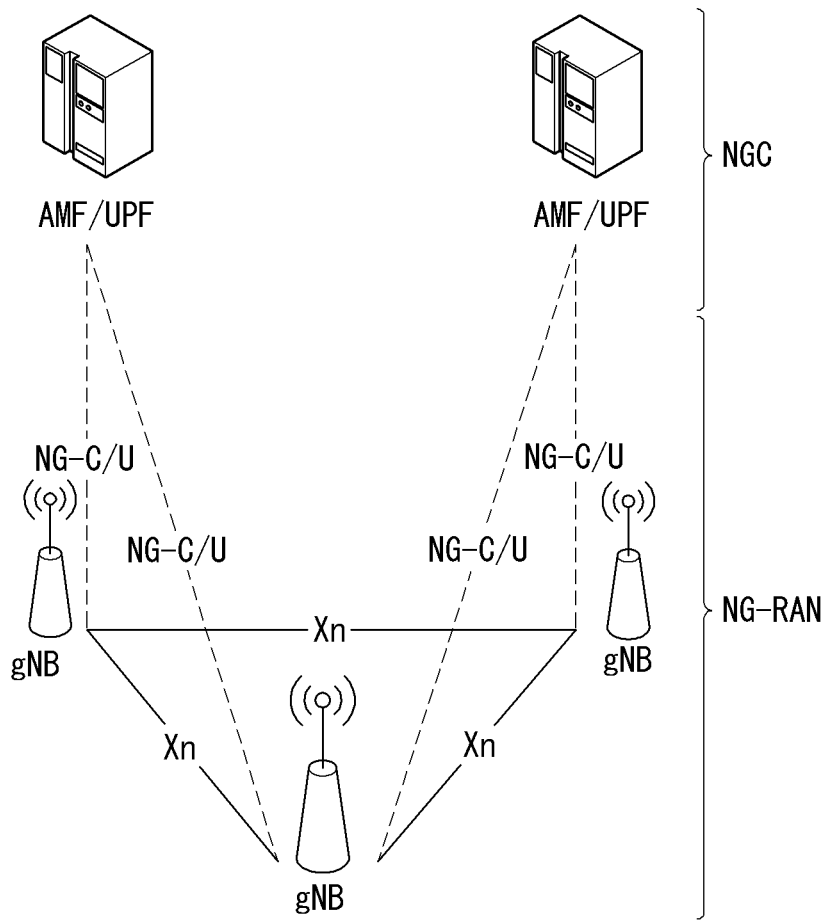
FIG. 1 illustrates an example of an overall structure of a new radio (NR) system to which a method proposed by the present disclosure may be implemented.

Some embodiments of the present disclosure are described in detail with reference to the accompanying drawings. A detailed description to be disclosed along with the accompanying drawings is intended to describe some exemplary embodiments of the present disclosure and is not intended to describe a sole embodiment of the present disclosure. The following detailed description includes more details in order to provide full understanding of the present disclosure. However, those skilled in the art will understand that the present disclosure may be implemented without such more details.

In some cases, in order to avoid making the concept of the present disclosure vague, known structures and devices are omitted or may be shown in a block diagram form based on the core functions of each structure and device.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station. The base station (BS) may be substituted with another term, such as a fixed station, a Node B, an eNB (evolved-NodeB), a base transceiver system (BTS), or an access point (AP). Furthermore, the terminal may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A is chiefly described, but the technical characteristics of the present disclosure are not limited thereto.

As propagation of smart phones and Internet of things (IoT) terminals rapidly spreads, the amount of information which is transmitted and received through a communication network increases. Accordingly, the next generation wireless access technology is an environment (e.g., enhanced mobile broadband communication) that provides a faster service to more users than existing communication systems (or existing radio access technology) needs to be considered.

To this end, a design of a communication system that considers machine type communication (MTC) providing a service by connecting multiple devices and objects is discussed. Further, a design of a communication system (e.g., Ultra-Reliable and Low Latency Communication (URLLC)) considering a service and/or a user equipment sensitive to reliability and/or latency of communication is also discussed.

Hereinafter, in this specification, for easy description, the next-generation wireless access technology is referred to as a new radio access technology (RAT) (NR) radio access technology and the wireless communication system to which the NR is applied is referred to as an NR system.

Definition of Terms eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC Non-standalone E-UTRA: A deployment configuration an eLTE eNB requires a gNB as an anchor for a control plane connection to an NGC.

User plane gateway: A terminal point of NG-U interface

General System

FIG. 1 is a diagram illustrating an example of an overall structure of a new radio (NR) system to which a method proposed by the present disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

NR (New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or µ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an Orthogonal Frequency Division Multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s = 1/(\Delta f_{max} \cdot N_f)$. In this case, $\Delta f_{max} = 480 \cdot 10^3$, and $N_f = 4096$. DL and UL transmission is configured as a radio frame having a section of $T_f = (\Delta f_{max} N_f / 100) \cdot T_s 10$ ms. The radio frame is composed of ten subframes each having a section of $T_{sf} = (\Delta f_{max} N_f / 1000) \cdot T_s = 1$ ms. In this case, there may be a set of UL frames and a set of DL frames.

Figure 2:
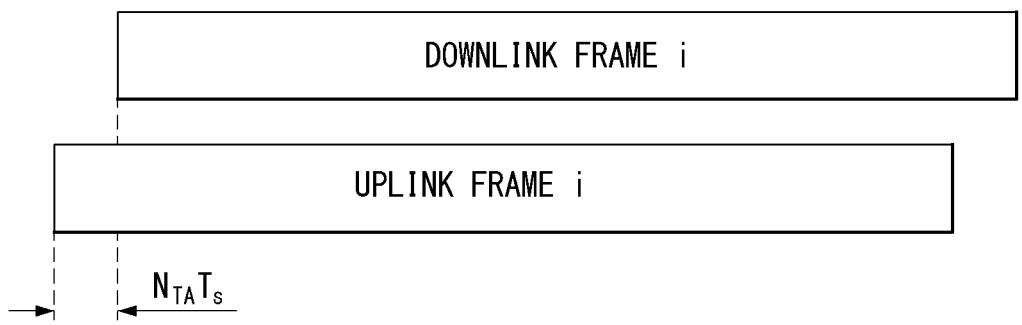
FIG. 2 illustrates a relationship between a uplink (UL) frame and a downlink (DL) frame in a wireless communication system to which a method proposed by the present disclosure may be implemented.

FIG. 2 illustrates a relationship between a UL frame and a DL frame in a wireless communication system to which a method proposed by the present disclosure may be implemented.

As illustrated in FIG. 2, a UL frame number I from a User Equipment (UE) needs to be transmitted $T_{TA} = N_{TA} T_s$ before the start of a corresponding DL frame in the UE.

Regarding the numerology μ, slots are numbered in ascending order of $n_s^\mu \in \{0, \ldots, N_{subframe}^{slots,\mu} - 1\}$ in a subframe, and in ascending order of $n_{s,f}^\mu \in \{0, \ldots, N_{frame}^{slots,\mu} - 1\}$ in a radio frame. One slot is composed of continuous OFDM symbols of $N_{symb}^\mu$, and $N_{symb}^\mu$ is determined depending on a numerology in use and slot configuration. The start of slots $n_s^\mu$ in a subframe is temporally aligned with the start of OFDM symbols $n_s^\mu N_{symb}^\mu$ the same subframe.

Not all UEs are able to transmit and receive at the same time, and this means that not all OFDM symbols in a DL slot or an UL slot are available to be used.

Table 2 shows the number of OFDM symbols per slot for a normal CP in the numerology μ, and Table 3 shows the number of OFDM symbols per slot for an extended CP in the numerology μ.

TABLE 2

| | Slot configuration | | | | | |
|---|---|---|---|---|---|---|
| | 0 | | | 1 | | |
| μ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | Slot configuration | | | | | |
|---|---|---|---|---|---|---|
| | 0 | | | 1 | | |
| μ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

Figure 3:
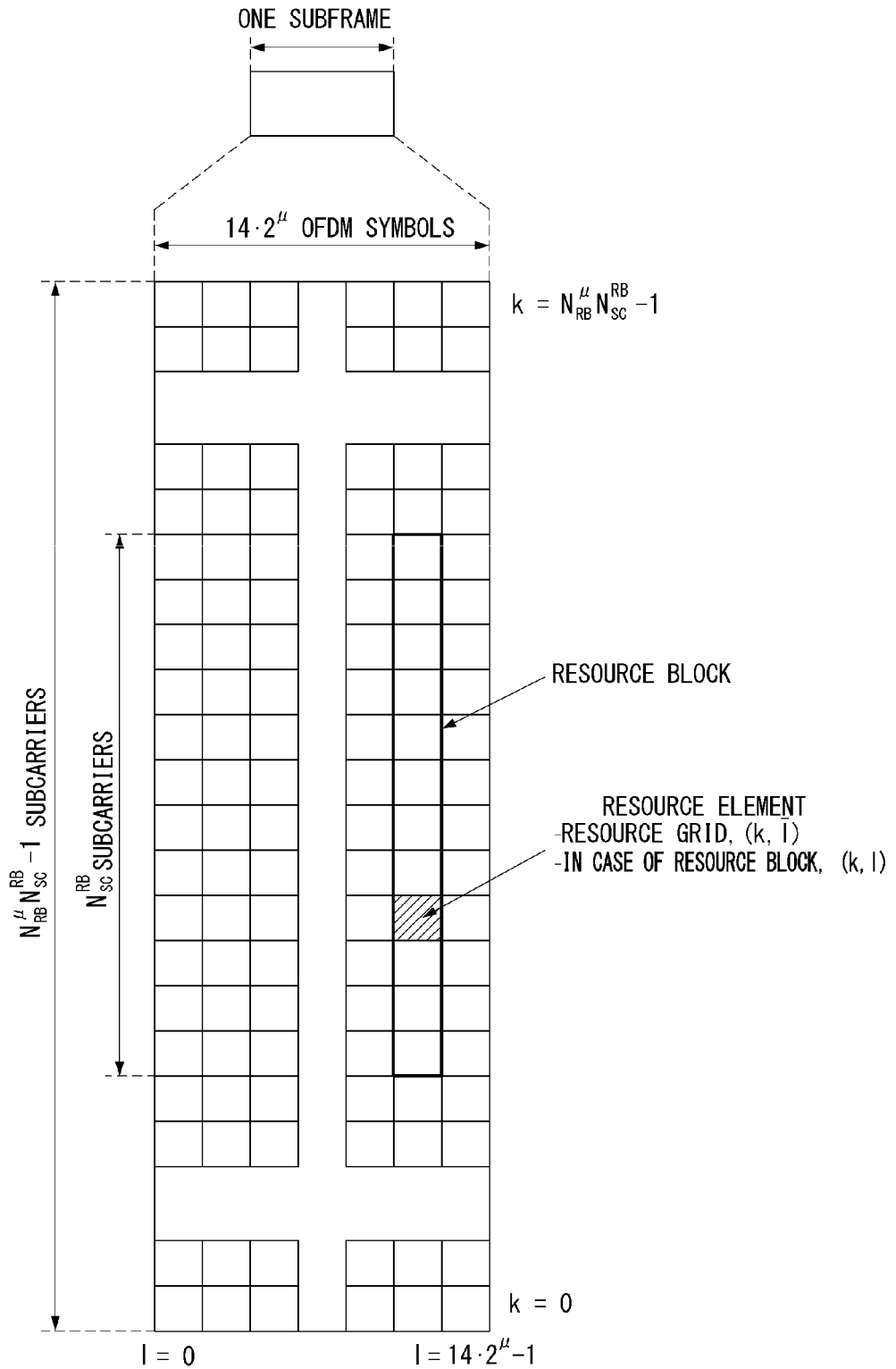
FIG. 3 illustrates an example of a resource grid supported in a wireless communication system to which a method proposed by the present disclosure may be implemented.

FIG. 3 illustrates an example of a resource grid supported in a wireless communication system to which a method proposed by the present disclosure may be implemented.

Referring to FIG. 3, a resource grid is composed of $N_{RB}^\mu N_{sc}^{RB}$ carriers in a frequency domain, each subframe composed of $14 \cdot 2\mu$ OFDM symbols, but the present disclosure is not limited thereto.

In the NR system, a transmitted signal is described by one or more resource grids, composed of $N_{RB}^\mu N_{sc}^{RB}$ subcarriers, and $2^\mu N_{symb}^{(\mu)}$ OFDM symbols Herein, $N_{RB}^\mu \leq N_{RB}^{max,\mu}$. The above RB indicates the maximum transmission bandwidth, and it may change not just between numerologies, but between UL and DL.

Figure 4:
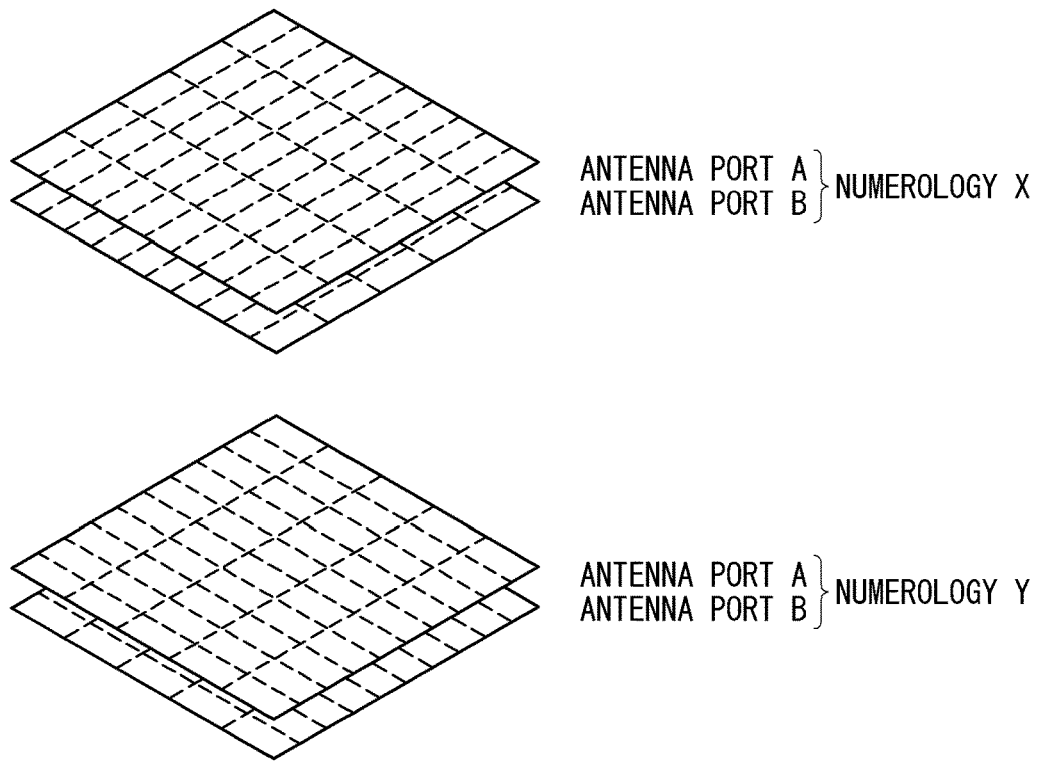
FIG. 4 illustrates examples of resource grids for each antenna port and numerology to which a method proposed in this specification may be applied.

In this case, as illustrated in FIG. 4, one resource grid may be configured for the numerology μ and an antenna port p.

FIG. 4 shows an example of antenna ports and ringer-specific resource grids to which the method proposed herein can be applied.

Each element of the resource grid for the numerology μ and the antenna port p is indicated as a resource element, and may be uniquely identified by an index pair (k,Ī). Herein, $k = 0, \ldots, N_{RB}^\mu N_{sc}^{RB} - 1$ is an index in the frequency domain, and $\bar{l} = 0, \ldots, 2^\mu N_{symb}^{(\mu)} - 1$ indicates a location of a symbol in a subframe. To indicate a resource element in a slot, the index pair (k,l) is used. Herein, $l = 0, \ldots, N_{symb}^\mu - 1$.

The resource element (k,Ī) for the numerology μ and the antenna port p corresponds to a complex value $a_{k,\bar{l}}^{(p,\mu)}$. When there is no risk of confusion or when a specific antenna port or numerology is specified, the indexes p and μ may be dropped and thereby the complex value may become $a_{k,\bar{l}}^{(p)}$ or $a_{k,\bar{l}}$.

In addition, a physical resource block is defined as $N_{sc}^{RB} = 12$ continuous subcarriers in the frequency domain. In the frequency domain, physical resource blocks may be numbered from 0 to $N_{RB}^\mu - 1$. At this point, a relationship between the physical resource block number $n_{PRB}$ and the resource elements (k,l) may be given as in Equation 1.

$$n_{PRB} = \left\lfloor \frac{k}{N_{sc}^{RB}} \right\rfloor \quad \text{Equation 1}$$

In addition, regarding a carrier part, a UE may be configured to receive or transmit the carrier part using only a subset of a resource grid. At this point, a set of resource blocks which the UE is configured to receive or transmit are numbered from 0 to $N_{URB}^{\mu}-1$ in the frequency region.

Synchronization Signal (SS) and SS/PBCH Block (1) Synchronization Signal

With respect to a physical layer cell identity, 1008 physical layer cell identities may be given by Equation 2.

$$N_{ID}^{cell}=3N_{ID}^{(1)}+N_{ID}^{(2)} \quad \text{Equation 2}$$

In Equation 2, $N_{ID}^{(1)} \in \{0, 1, \ldots, 335\}$ and $N_{ID}^{(2)} \in \{0, 1, 2\}$.

Further, with respect to the primary synchronization signal (PSS), a sequence $d_{PSS}(n)$ for the PSS may be defined by Equation 3.

$$d_{PSS}(n)=1-2x(m) \quad m=(n+43N_{ID}^{(2)})\bmod 127 \quad 0\leq n<127 \quad \text{Equation 3}$$

In Equation 3, x(m) (i.e., a polynomial for generating the sequence of the PSS) may be configured as shown in Equation 4 and an initial value (i.e., initial poly shift register value or an initial condition) is shown in Equation 5.

$$x(i+7)=(x(i+4)+x(i))\bmod 2 \quad \text{Equation 4}$$

$$[x(6)\,x(5)\,x(4)\,x(3)\,x(2)\,x(1)\,x(0)]=[1\ 1\ 0\ 1\ 1\ 0]$$

Further, with respect to a secondary synchronization signal (SSS), a sequence $d_{sSS}(n)$ for the SSS may be defined by Equation 6.

$$d_{SSS}(n) = [1 - 2x_0((n + m_0)\bmod 127)]$$
$$[1 - 2x_1((n + m_1)\bmod 127)] \quad \text{Equation 6}$$
$$m_0 = 15\left\lfloor \frac{N_{ID}^{(1)}}{112} \right\rfloor + 5N_{ID}^{(2)}$$
$$m_1 = N_{ID}^{(1)} \bmod 112$$
$$0 \leq n < 127$$

In Equation 6, $x_0(m)$ and $x_1(m)$ (i.e., a first polynomial and a second polynomial for generating the sequence of the SSS) may be configured as shown in Equation 7 and each initial value (i.e., initial poly shift register value) is shown in Equation 8.

$$x_0(i+7)=(x_0(i+4)+x_0(i))\bmod 2$$

$$x_1(i+7)=(x_1(i+1)+x_1(i))\bmod 2 \quad \text{Equation 7}$$

$$[x_0(6)\,x_0(5)\,x_0(4)\,x_0(3)\,x_0(2)\,x_0(1)\,x_0(0)]=[0\ 0\ 0\ 0\ 0\ 0\ 1]$$

$$[x_1(6)\,x_1(5)\,x_1(4)\,x_1(3)\,x_1(2)\,x_1(1)\,x_1(0)]=[0\ 0\ 0\ 0\ 0\ 0\ 1]$$

In this case, referring to Equations 4 and 7, one (i.e., $x_0(m)$) of the polynomials for generating the sequence of the SSS is configured to be equal to the polynomial (i.e., x(m)) for generating the sequence of the PSS. However, the initial value of the polynomial for generating the sequence of the PSS is configured to be different from the initial value of the polynomial for generating the sequence of the SSS.

(2) SS/PBCH Block

Contents related to a time-frequency structure of the SS/PBCH block will be described. In the time domain, the SS/PBCH block constitutes four OFDM symbols numbered from 0 to 3 in order. Further, in the frequency domain, the SS/PBCH block constitutes 24 contiguous resource blocks numbered from 0 to 287 in order and starts with the lowest numbered resource block.

The UE needs to assume a sequence $d_{PSS}(0), \ldots, d_{PSS}(126)$ of symbols constituting the PSS, which are to be scaled by an element $\beta_{SS}$ and mapped to resource elements $(k,l)_{p,\mu}$ in an ascending order of k to follow PSS power allocation. Here, k and l are given by Table 4 below and represent a frequency index and a time index in the SS/PBCH block, respectively.

Further, the UE needs to assume a sequence $d_{SSS}(0), \ldots, d_{SSS}(126)$ of symbols constituting the PSS, which are to be scaled by an element $\beta_{SS}$ and mapped to resource elements $(k,l)_{p,\mu}$ in an ascending order of k to follow SSS power allocation. Here, k and l are given by Table 4 below and represent the frequency index and the time index in the SS/PBCH block, respectively.

Further, the UE needs to assume a sequence $d_{PBCH}(0), \ldots, d_{PBCH}(M_{symb}-1)$ of complex-valued symbols constituting the PBCH, which are to be scaled by an element $\beta_{PBCH}$ and mapped to resource elements $(k,l)_{p,\mu}$ in order starting with $d_{PBCH}(0)$ to follow PBCH power allocation. Here, the resource elements are not for PBCH demodulation reference signals.

Mapping for resource elements that are not reserved for other purposes first increases in the order of index k and then increases for index 1. Here, k and l are given by Table 4 below and represent the frequency index and the time index in the SS/PBCH block, respectively.

Further, the UE needs to assume a sequence $r_1(0), \ldots, r_1(71)$ of complex-valued symbols constituting the demodulated reference signal for the PBCH in symbol I of the SS/PBCH block, which are to be scaled by an element $\beta_{PBCH}$ and mapped to resource elements $(k,l)_{p,\mu}$ in order starting with k to follow the PBCH power allocation. Here, k and l are given by Table 4 below and represent the frequency index and the time index in the SS/PBCH block, respectively.

Further, the UE needs to assume that the antenna port is 4000 (i.e., p=4000) and a subcarrier spacing configuration is $\mu \in \{0, 1, 3, 4\}$ for the SS/PBCH block and needs to assume the same cyclic prefix (CP) length and subcarrier spacing for the PSS, SSS, and PBCH.

TABLE 4

| Channel or signal | OFDM symbol number $l$ | Subcarrier number $k$ |
| --- | --- | --- |
| PSS | 0 | 80, 81, . . . , 206 |
| SSS | 2 | 80, 81, . . . , 206 |
| PBCH | 1, 3 | 0, 1, . . . , 287 |
| DM-RS for PBCH | 1, 3 | 2, 6, 10, 14, 18, . . . , 282, 286 |

Further, with respect to a time location of the SS/PBCH block, the UE needs to monitor available SS/PBCH blocks at predefined time domain locations on the standard (specification).

Self-Contained Subframe Structure

A time division duplexing (TDD) structure considered in the NR system is a structure in which both uplink (UL) and downlink (DL) are processed in one subframe. This is to minimize the latency of data transmission in the TDD system and the structure is referred to as a self-contained subframe structure.

Figure 5:
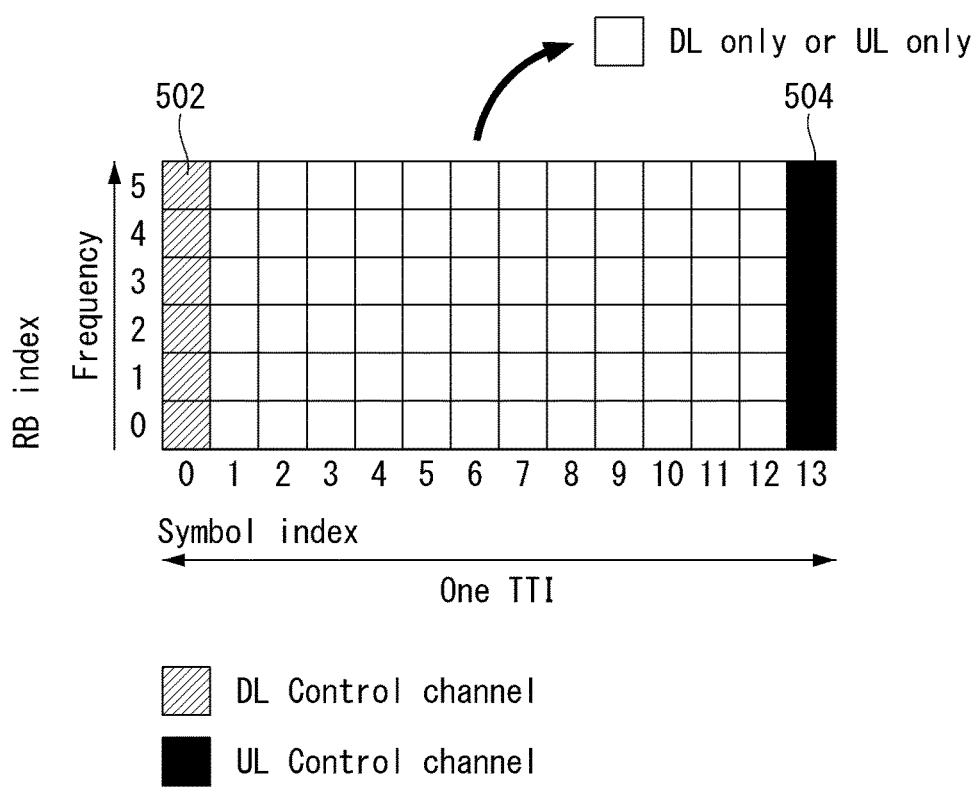
FIG. 5 illustrates an example of a self-contained subframe structure to which the method proposed in this specification may be applied.

FIG. 5 illustrates an example of a self-contained subframe structure to which the method proposed in this specification may be applied. FIG. 5 is just for convenience of the description and does not limit the scope of the present invention.

Referring to FIG. 5, it is assumed that one subframe is constituted by 14 orthogonal frequency division multiplexing (OFDM) symbols as in legacy LTE.

In FIG. 5, a region 502 refers to a downlink control region and a region 504 refers to an uplink control region. Further, a region (that is, a region without a separate indication) other than the regions 502 and 504 may be used for transmitting downlink data or uplink data.

That is, uplink control information and downlink control information may be transmitted in one self-contained subframe. On the contrary, uplink data or downlink data is transmitted in one self-contained subframe.

When the structure illustrated in FIG. 2 is used, in one self-contained subframe, downlink transmission and uplink transmission may sequentially proceed and transmission of the downlink data and reception of uplink ACK/NACK may be performed.

Consequently, when an error of data transmission occurs, a time required for retransmitting data may be reduced. Therefore, latency associated with data delivery may be minimized.

In the self-contained subframe structure illustrated in FIG. 5, a time gap for a process of switching from a transmission mode to a reception mode in a base station (eNodeB, eNB, or gNB) and/or a terminal (user equipment (UE)) or a process of switching from the reception mode to the transmission mode is required. In association with the time gap, when the uplink transmission is performed after the downlink transmission in the self-contained subframe, some OFDM symbol(s) may be configured as a guard period (GP).

Analog Beamforming

In a millimeter wave (mmWave, mmW) communication system, as the wavelength of the signal becomes shorter, multiple (or multiplex) antennas may be installed in the same area. For example, in a 30 CHz band, the wavelength is approximately 1 cm, and when antennas are installed at an interval of 0.5 lambda in a panel of 5 cm×5 cm according to a two-dimensional arrangement form, a total of 100 antenna elements may be installed.

Accordingly, in the mmW communication system, a method for increasing coverage or increasing the throughput by increasing a beamforming (BF) gain using multiple antenna elements or increasing a throughput may be considered.

In this case, when a transceiver unit (TXRU) is installed so as to adjust transmission power or a phase for each antenna element, independent beamforming is possible for each frequency resource.

However, a method for installing the TXRU in all antenna elements (e.g., 100 antenna elements) may be ineffective in terms of cost. As a result, a method for mapping multiple antenna elements to one TXRU and controlling a direction of a beam by using an analog phase shifter may be considered.

The aforementioned analog beamforming method may generate only one beam direction in all bands, so that a frequency selective beam operation may not be performed.

As a result, hybrid beamforming with B TXRUs that are fewer than Q antenna elements, as an intermediate form of digital beamforming and analog beamforming, may be considered. In this case, although there is a difference depending on a connection method of B TXRUs and Q antenna elements, the number of directions of the beams that may be transmitted at the same time is limited to B or less.

Hereinafter, in this specification, contents regarding a synchronization signal that may be used when a frame structure in which two or more different numerologies are simultaneously present at the same frequency and/or the same time point is considered will be described.

In order to distinguish the corresponding system from the legacy LTE system, a physical signal and/or a physical channel used in the corresponding system may be designated (or defined) as an x-Primary Synchronization signal (PSS), an x-Secondary Synchronization Signal (SSS), an x-Physical Broadcast Channel (PBCH), an x-Physical Downlink Control Channel (PDCCH)/x-Enhanced PDCCH (EPDCCH), etc to which 'x-' is added. Here, the 'x' may refer to 'NR'. The synchronization signal (SS) considered in this specification refers to signals used by the UE to perform synchronization, such as x-PSS, x-SSS, and/or x-PBCH.

Two synchronization signal design methods may be considered when two or more different numerologies (e.g., subcarrier spacing, etc.) co-exist.

First, a method for transmitting a different synchronization signal for each numerology may be considered. However, in the case of the method, the system may have large synchronization overhead the UE may have high decoding complexity. Next, a method may be considered, in which one default numerology is configured through a predetermined method (that is, a preconfigured reference) between the base station and the UE among multiple numerologies and the synchronization signal is transmitted according to the configured default numerology. The method is advantageous in that the decoding complexity and the synchronization overhead for the synchronization signal are small as compared with the first method described above.

In this specification, a method for transmitting and receiving the synchronization signal according to one (i.e., single) default numerology that is preconfigured between the base station and the UE among multiple numerologies is described. In this case, the default numerology for transmission of the synchronization signal may be determined independently in accordance with a frequency band (e.g., a band of 6 GHz or less, mmWave of 6 GHz or more, and the like).

In addition, the UE may be configured to obtain (or find out) information regarding the default numerology through blind decoding. In this case, in order to reduce the number of blind decodings for the default numerology, a candidate(s) may be preconfigured in which each default numerology may be configured to a different value. For example, a scheme for mapping one numerology to one set by configuring two channel raster sets (or channel raster configurations) may be used when there are two candidates for the default numerology. As an example, a first numerology may be configured at 100 kHz and a second numerology may be configured at 300 kHz.

Hereinafter, a method for designing (or configuring, generating) the sequence for the synchronization signal in a system in which the default numerology is used will be described. Specifically, a method will be described below, in which when a default frequency band to which the synchronization signal is transmitted is preconfigured and when the frequency band is configured to use the default numerology, a sequence (i.e., a sequence configured to the PSS, a sequence used to generate the PSS) which may be used as the primary synchronization signal (PSS) is configured and allocated. Further, in this specification, a method for configuring and assigning a sequence that may be used as not only the PSS but also a secondary synchronization signal (SSS) will also be described.

In addition, it goes without saying that a sequence design scheme of the synchronization signal described below in this specification may be applied in the same or similar manner even when the default numerology is not used.

First, some of the elements that may be considered to determine the default numerology and/or the numerology used (or applied) to the synchronization signal are as follows.

Subcarrier spacing
Cyclic Prefix (CP) length
Bandwidth for synchronization signal Hereinafter, the elements will be described in detail.

First, contents related to the subcarrier spacing are described. In general, a synchronization signal based on Cyclic Prefix-Orthogonal Frequency Division Multiplexing (CP-OFDM) may be sensitive to a frequency offset value. Therefore, in order to determine the subcarrier spacing, it is necessary to consider the frequency offset value according to a carrier frequency value. According to a simulation assumption for the performance verification of the NR system, required frequency offset values are different according to initial acquisition and non-initial acquisition. Here, the initial acquisition and the non-initial acquisition may mean initial acquisition and non-initial acquisition for the synchronization signal.

In the case of the initial acquisition, a transmission and reception point (TRP) is considered to be a uniform distribution criterion +/−0.05 ppm and in the case of the UE, the TRP may be considered to be the uniform distribution criterion +/−5, 10, 20 ppm. In contrast, in the case of the non-initial acquisition, the TRP is considered to be the uniform distribution criterion +/−0.05 ppm and in the case of the UE, the TRP may be considered to be the uniform distribution criterion +/−0.1 ppm. In this case, the frequency offset values are calculated according to the carrier frequency values using 5 ppm, 10 ppm, and 20 ppm that are considered in the initial acquisition, as shown in Table 5 below.

TABLE 5

| ppm | Carrier Frequency (GHz) | | |
|---|---|---|---|
| | 4 | 30 | 70 |
| 5 | 20 kHz | 150 kHz | 350 kHz |
| 10 | 40 kHz | 300 kHz | 700 kHz |
| 20 | 80 kHz | 600 kHz | 1400 kHz |

The values in Table 5 are values calculated according to exemplary carrier frequencies that may be considered in the NR system. Referring to Table 5, the carrier frequency offset tends to increase as the carrier frequency increases. In general, an influence of the carrier frequency offset may be important in an initial acquisition situation. Therefore, it is necessary to reduce the influence of the carrier frequency offset on the synchronization signal (i.e., PSS).

In addition, Table 6 below shows normalized frequency offset values according to specific subcarrier spacing values for different carrier frequency values.

TABLE 6

| Subcarrier Spacing (kHz) | ppm | Carrier Frequency (GHz) | | |
|---|---|---|---|---|
| | | 4 | 30 | 70 |
| 15 | 5 | 1.33 | 10 | 23.33 |
| | 10 | 2.67 | 20 | 46.67 |
| | 20 | 5.33 | 40 | 93.33 |
| 30 | 5 | 0.67 | 5 | 11.67 |
| | 10 | 1.33 | 10 | 23.33 |
| | 20 | 2.67 | 20 | 46.67 |
| 60 | 5 | 0.33 | 2.5 | 5.83 |
| | 10 | 0.67 | 5 | 11.67 |
| | 20 | 1.33 | 10 | 23.33 |
| 120 | 5 | 0.17 | 1.25 | 2.92 |
| | 10 | 0.33 | 2.5 | 5.83 |
| | 20 | 0.67 | 5 | 11.67 |
| 240 | 5 | 0.08 | 0.63 | 1.46 |
| | 10 | 0.17 | 1.25 | 2.92 |
| | 20 | 0.33 | 2.5 | 5.83 |
| 480 | 5 | 0.04 | 0.31 | 0.73 |
| | 10 | 0.08 | 0.63 | 1.46 |
| | 20 | 0.17 | 1.25 | 2.92 |

Referring to Table 6, the frequency offset value tends to decrease as the subcarrier spacing value increases. That is, initial access performance may be enhanced as the subcarrier spacing value increases. Therefore, when considering 6 GHz or less (below 6 GHz) (i.e., when the analog beamforming is not performed), a default subcarrier spacing is set to $\Delta f_d$ and the subcarrier spacing of the synchronization signal may be set to be N times (i.e., $N*\Delta f_d$) of the default subcarrier spacing. In this case, N may be set to a multiple of 2 or $2^n$ (here, n is a positive integer).

Further, the subcarrier spacing of signals such as the SSS and/or the Physical Broadcast Channel (PBCH) rather than initial acquisition may be configured to use the same value as the subcarrier spacing (i.e., the subcarrier spacing applied to the PSS) used by the PSS. However, since the SSS and the PBCH are not initially acquired, the SSS and the PBCH may not be significantly affected by the frequency offset value. Thus, for the SSS and/or PBCH, a default subcarrier spacing (e.g., $\Delta f_d$) rather than the subcarrier spacing (e.g., $N*\Delta f_d$) used by the PSS may be configured.

Next, contents related to the CP length are described. In general, the CP length may be used to prevent Inter-Symbol Interference (ISI) caused by a delay spread. Further, since a symbol duration becomes shorter as the subcarrier spacing becomes larger, the CP length may also become shorter as the subcarrier spacing becomes larger. Therefore, when a subcarrier spacing with a large value is used, the CP length is shortened, so that performance in a channel with a large delay spread may be degraded.

However, in order to support the NR system in a band (i.e., below 6 GHz band) of 6 GHz or less, the system needs to be configured to approximately operate even in a channel (e.g., Extended Typical Urban Model (ETU), Tapped-delay line, etc.) with a long delay spread. Therefore, considering the delay spread, it may be advantageous that the CP length may be configured to be larger.

Next, contents related to the bandwidth for the synchronization signal are described. A bandwidth used for the synchronization signal of the existing LTE system (i.e., legacy LTE system) is 1.08 MHz. When, in the NR system, a subcarrier spacing with a value larger than the subcarrier spacing value of the existing LTE system is configured, a wider bandwidth is used for the synchronization signal. However, as the bandwidth to be received becomes wider, calculation complexity of the UE may increase. Therefore, in order to prevent the calculation complexity from increasing, it may be desirable that the bandwidth to be used for the synchronization signal of the NR system is kept similar to that of the LTE system.

Considering the above elements, there may be various methods for designing the synchronization signal of the NR system. In various embodiments of the present invention, four following methods (Method 1 to Method 4) may be considered. Hereinafter, in the methods, $\Delta f_d$ represents the default subcarrier spacing and $\Delta f_{PSS}$ and $\Delta f_{SSS}$ represent subcarrier spacings used for PSS (i.e. NR PSS) and SSS (i.e. NR SSS), respectively.

(Method 1)

Method 1 is a method for configuring the subcarrier spacings to be used (or applied) to the PSS and the SSS to the same value as the default subcarrier spacing (i.e., $\Delta f_d = \Delta f_{PSS} = \Delta f_{SSS}$). In other words, when the default subcarrier spacing to be used for each frequency band is determined (or configured), the subcarrier spacings to be used for the PSS and the SSS may be configured to be equal to the default subcarrier spacing.

For example, when a default subcarrier spacing of 15 kHz is configured for a center frequency in the vicinity of 4 GHz or 6 GHz, the subcarrier spacings applied to the PSS and SSS may be configured to 15 kHz. However, when the subcarrier spacing for the synchronization signal is configured to 15 kHz (i.e., the subcarrier spacing of the LTE system) in the band (below 6 GHz) of 6 GHz or less as described above (e.g., Table 5), a frequency estimation (offset) operation of the PSS may be affected by the carrier frequency offset.

As another example, when a default subcarrier spacing of 60 kHz is configured for the center frequency in the vicinity of 4 GHz or 6 GHz, the subcarrier spacings applied to the PSS and SSS may also be configured to 60 kHz. When the subcarrier spacing for the synchronization signal is configured to 60 kHz higher than 15 kHz as described above (e.g., Table 5), the frequency estimation (offset) operation of the PSS may be affected by the carrier frequency offset.

(Method 2)

Method 2 is a method (i.e., $N^*\Delta f_d = \Delta f_{PSS} = \Delta f_{SSS}$) for configuring the subcarrier spacings to be used for the PSS and the SSS to be equal to each other and configuring the subcarrier spacings that are configured to be equal to each other by scaling N times the default subcarrier spacing. In other words, when the default subcarrier spacing to be used for each frequency band is determined (or configured), the subcarrier spacings to be used for the PSS and the SSS may be configured by scaling N times the default subcarrier spacing. In this case, N may be scaled in the form of a multiple of two (i.e., N=(2n)±1, where n is a positive integer), or may be scaled in the form of to $2^m$ (i.e., $N=2^m$, where m is an integer).

For example, when the default subcarrier spacing of 15 kHz is configured for the center frequency in the vicinity of 4 GHz or 6 GHz, the subcarrier spacings applied to the PSS and SSS may be configured to 60 kHz acquired by scaling 4 times 15 kHz. Using the method, the frequency estimation (offset) operation of the PSS may be less affected by the carrier frequency offset.

(Method 3)

Method 3 is a method (i.e., $N^*\Delta f_d = \Delta f_{PSS}$, $\Delta f_d = \Delta f_{SSS}$) for configuring the subcarrier spacing to be used for the SSS to be equal to the default subcarrier spacing and configuring the subcarrier spacing to be used for the PSS by scaling N times the default subcarrier spacing. In other words, when the default subcarrier spacing to be used for each frequency band is determined (or configured), the subcarrier spacing to be used for the PSS may be configured by scaling N times the default subcarrier spacing and the subcarrier spacing to be used for the SSS may be configured to be equal to the default subcarrier spacing.

For example, when the default subcarrier spacing of 15 kHz is configured for the center frequency in the vicinity of 4 GHz or 6 GHz, the subcarrier spacing applied to the PSS may be configured to 60 kHz (N=4) and the subcarrier spacing applied to the SSS may be configured to 15 kHz. In this case, since the frequency estimation (offset) operation of the PSS may be less affected by the carrier frequency offset and the CP length in the SSS is the same as that of the existing LTE system, it is advantageous in that a cell ID detecting operation may be efficiently performed even in the channel having the long delay spread.

(Method 4)

Method 4 is a method (i.e., $\Delta f_d = \Delta f_{PSS}$, $N^*\Delta f_d = \Delta f_{SSS}$) for configuring the subcarrier spacing to be used for the PSS to be equal to the default subcarrier spacing and configuring the subcarrier spacing to be used for the SSS by scaling N times the default subcarrier spacing. In other words, when the default subcarrier spacing to be used for each frequency band is determined (or configured), the subcarrier spacing to be used for the SSS may be configured by scaling N times the default subcarrier spacing and the subcarrier spacing to be used for the PSS may be configured to be equal to the default subcarrier spacing.

For example, when the default subcarrier spacing of 15 kHz is configured for the center frequency in the vicinity of 4 GHz or 6 GHz, the subcarrier spacing applied to the SSS may be configured to 60 kHz (N=4) and the subcarrier spacing applied to the PSS may be configured to 15 kHz.

Further, in various embodiments of the present invention, different subcarrier spacings may be configured for the PSS and the SSS, as in Method 3 and Method 4 described above. In this case, a method for transmitting the PSS and/or the SSS using a bandwidth acquired by scaling down a bandwidth to be transmitted by $\frac{1}{2^m}$ times and symbols of a number increased by $2^m$ times based on one symbol may be considered.

For example, as in Method 3 described above, when the default subcarrier spacing of 15 kHz is configured for the center frequency in the vicinity of 4 GHz or 6 GHz, the subcarrier spacing applied to the PSS may be configured to 60 kHz (N=4) and the subcarrier spacing applied to the SSS may be configured to 15 kHz. In this case, when 6 Ribs (i.e., 1.08 MHz, 72 resource elements (REs)) are allocated to an SSS sequence (e.g., a legacy SSS sequence) like the existing LTE system, the SSS may be transmitted via one symbol.

In this case, a method for limiting the bandwidth in which the PSS is to be transmitted to 1.08 MHz and configuring the PSS sequence to be transmitted via four symbols may be considered. A detailed example thereof is illustrated in FIG. 6.

Figure 6:
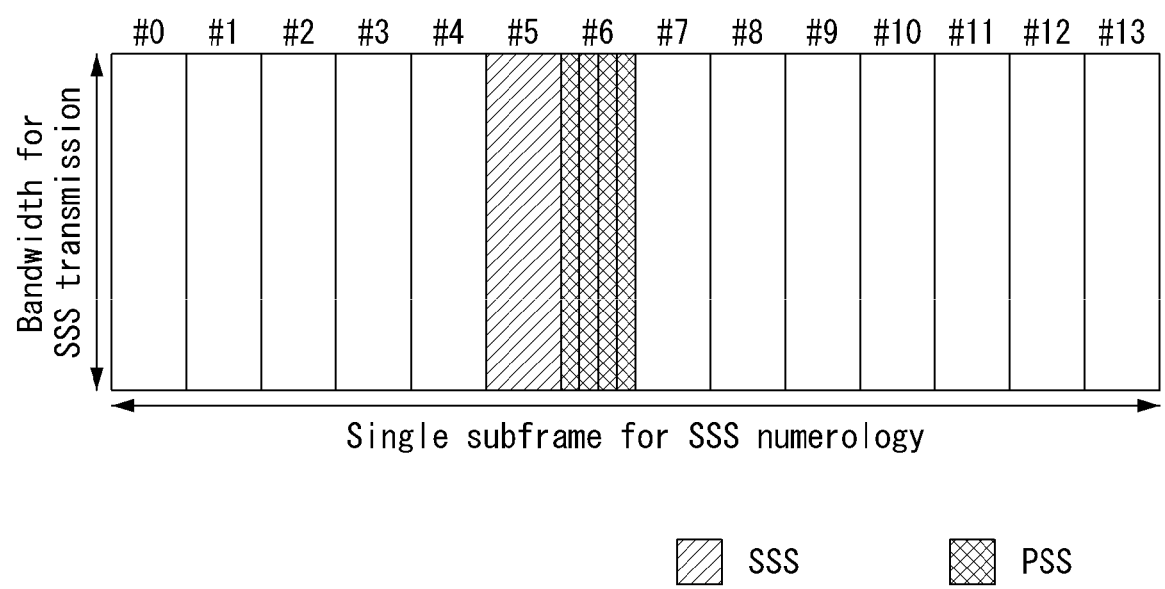
FIG. 6 illustrates an example of a method for transmitting a synchronization signal to which a method proposed in this specification may be applied.

FIG. 6 illustrates an example of a method for transmitting a synchronized signal to which a method proposed in this specification may be applied. FIG. 6 is just for convenience of the description and does not limit the scope of the present invention.

Referring to FIG. 6, it is assumed that the synchronization signals (i.e., PSS and SSS) are transmitted in accordance with the bandwidth for SSS transmission. Further, it is assumed that the SSS is transmitted in a 5th OFDM symbol (OFDM symbol #5) of the subframe (e.g., a single subframe for the SSS numerology) and the PSS is transmitted through four short OFDM symbols positioned at a location of a 6th OFDM symbol (OFDM symbol #6). In this case, since the PSS is transmitted through four OFDM symbols, the bandwidth for the PSS is ¼ times the existing bandwidth.

In addition, a position (or symbol) at which the SSS and/or the PSS are/is transmitted is merely an example, and the SSS and/or the PSS may be positioned at an arbitrary symbol which is not overlapped among 14 symbols (i.e., OFDM symbols #0 to #13).

The sequence for the PSS transmitted through four OFDM symbols may be configured to be transmitted in the same scheme as the following examples.

For example, for PSS transmission, four Zadoff-Chu sequences of length 17 using different root indexes may be configured to be transmitted one by one in each symbol. For another example, for PSS transmission, one ZC sequence of length 17 using the same root index may be configured to be repeatedly transmitted to each symbol. For yet another example, for PSS transmission, two ZC sequences (i.e., a first sequence A and a second sequence B) of length 17 using different root indexes may be generated and the two generated sequences may be configured to be transmitted through four symbols according to various types of combinations such as ABAB, AABB, ABBA, etc.

In the above-described PSS transmission schemes, it is advantageous to enhance the correlation performance by applying a cover code to each symbol. Further, since the PSS is configured at a subcarrier spacing of 60 kHz, it takes only 1 ms to transmit the PSS over four symbols. In addition, the PSS and SSS transmission schemes as described above are advantageous to filter only a predetermined bandwidth (e.g., 1.08 MHz) and receive the synchronization signal even if different subcarrier spacings are configured for the PSS and the SSS.

In this case, the CP scaled down to a subcarrier spacing value (e.g., 60 kHz) applied to the PSS may be configured in front of each of the four symbols.

Further, in various embodiments of the present invention, the same subcarrier spacing may be configured for the PSS and the SSS, as in Method 1 and Method 2 described above. In this case, the sequence (i.e., the PSS sequence) to be used for the PSS may be configured or allocated through the following methods.

First, a method using PSS having the same length as the SSS may be considered. That is, the method is a method for configuring the length of the SSS sequence and the length of the PSS sequence to be equal to each other. For example, as described above (e.g., Method 1), when the default subcarrier spacing of 15 kHz is configured for the center frequency in the vicinity of 4 GHz or 6 GHz, the subcarrier spacings applied to the PSS and SSS may be configured to 15 kHz. In this case, when 6 RBs (i.e., 1.08 MHz, 72 REs) are allocated to the PSS and the SSS like the existing LTE system, (each of) the PSS and the SSS may be transmitted via one symbol.

Next, a method for using a sequence having a length N times shorter than the SSS for PSS transmission, but maintaining the existing bandwidth constant may be considered. In this case, the existing bandwidth may be maintained constant by mapping the PSS sequence every N REs instead of mapping the PSS sequence to the RE on a frequency axis. That is, even if the PSS sequence is shorter than the SSS sequence, the transmission bandwidths of the PSS and SSS may be maintained to be equal to each other by mapping the PSS sequence at regular intervals. In this case, '0' may be filled in a subcarrier (or RE) to which the PSS sequence is not mapped and the subcarrier to which the PSS sequence is mapped may be transmitted using power increased by N times. A detailed example thereof is illustrated in FIGS. 7A and 7B.

Figure 7A:
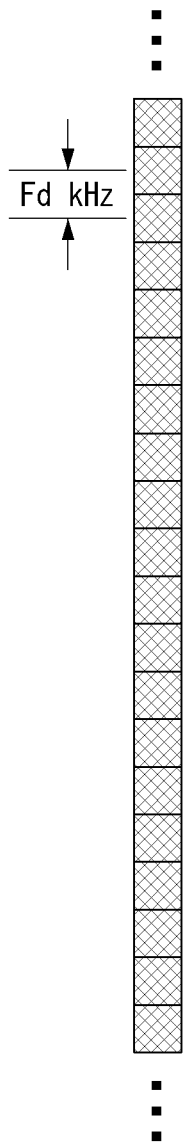
FIGS. 7A and 7B illustrate another example of the method for transmitting the synchronized signal to which the method proposed in this specification may be applied.
Figure 7B:
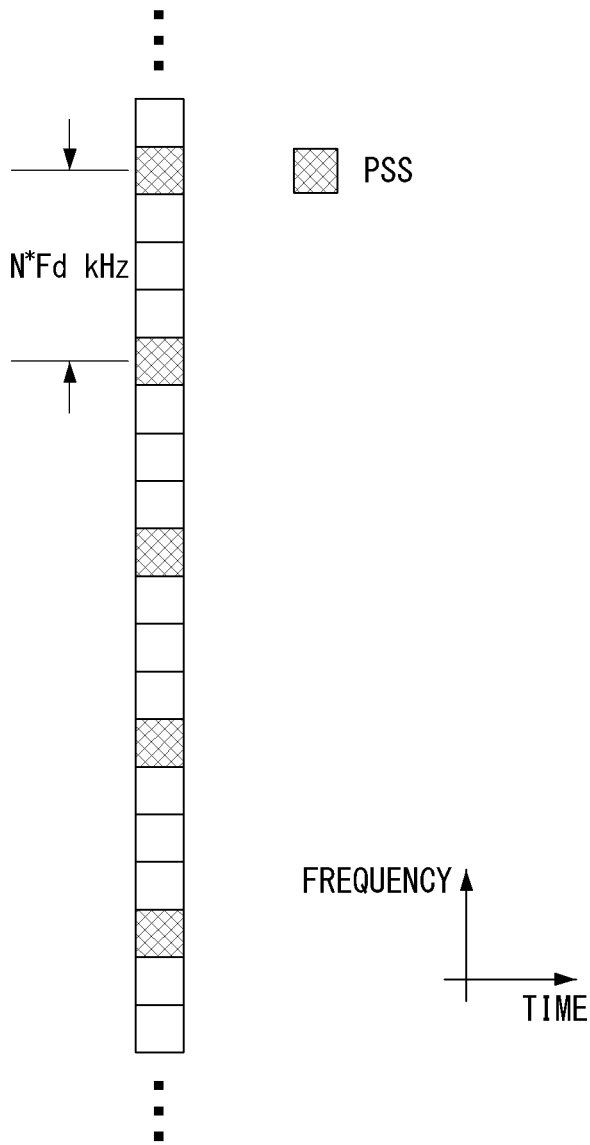

FIGS. 7A and 7B illustrate another example of the method for transmitting the synchronized signal to which the method proposed in this specification may be applied. FIGS. 7A and 7B are just for convenience of the description and does not limit the scope of the present invention.

Specifically, FIG. 7A illustrates the existing PSS sequence mapping scheme and FIG. 7B illustrates a PSS sequence mapping scheme proposed in this specification.

Referring to FIGS. 7A and 7B, each square means the subcarrier (or RE), and the checked region means an RE to which the PSS sequence is mapped. Further, it is assumed that the length of the PSS sequence proposed in this specification is configured to be N times shorter than that of the existing PSS sequence.

In the case of FIG. 7A, as described above, the existing PSS sequence may be configured to be mapped to every RE and the subcarrier spacing may be expressed by Fd kHz.

In contrast, in the case of FIG. 7B, the PSS sequence proposed in this specification may be configured to be mapped to every N REs. In this case, a spacing between subcarriers (i.e., the subcarriers to which the PSS sequence is mapped) to which '0' is not mapped may be expressed as N*Fd kHz. Further, on a time axis, the same sequence is repeated N times in a space within one symbol excluding the CP length, and as a result, an actual symbol duration is not changed. As an example, when the PSS sequence is mapped to every RE, a time duration corresponding to the PSS sequence may be configured to be equal to a symbol duration. In this case, when the PSS sequence is mapped to every N REs, the time duration corresponding to the PSS sequence may be 1/N times the symbol duration. Accordingly, when the PSS sequence is mapped to every N REs, the PSS sequence may be repeated N times for the same symbol duration.

Using the PSS sequence configuring and allocating method (e.g., the method illustrated in FIG. 7B) proposed in this specification, when the UE performs frequency estimation (or frequency measurement) using the PSS, the UE may be less affected by the carrier frequency offset. Specifically, when the PSS is mapped to every REs according to the existing scheme (e.g., FIG. 7A), the inter-cell interference (ICI) due to adjacent subcarriers may be large depending on the influence of the carrier frequency offset. On the other hand, when the PSS is mapped and transmitted for every N REs as proposed in this specification, there is the inter-cell interference due to subcarriers spaced apart by N*subcarrier spacing, so that the influence may be reduced.

Further, regarding a cell ID (e.g., a physical layer cell ID), in the existing case, a method is used, in which one of three PSS sequence candidates and one of 168 SSS sequence candidates are selected to select (or identify or determine) one of 504 cell identifiers. However, in the above method, in order to distinguish three candidates for selecting the PSS, the UE needs to repeatedly perform operations with high complexity three times.

Accordingly, in order to reduce a burden of the UE, a method for selecting one of the cell identifiers by using one candidate for the PSS and using candidates corresponding to the total number of cell identifiers for the SSS may be considered. As an example, a method for using one candidate for the PSS and using 504 or 1008 candidates for the SSS may be considered.

In this case, since the method reduces the number of candidates in relation to the PSS, the PSS sequence(s) of the above-described scheme may be used as it is. As an example, the PSS sequence may be generated using Equations 3, 4, and 5 described above.

However, since the number of candidates increases for the SSS, a design method for the SSS sequence needs to be newly considered. That is, a method for generating (or configuring) the SSS sequences as many as all cell identifiers needs to be considered. As an example, the PSS sequence may be generated using Equations 6, 7, and 8 described above.

Specifically, the SSS may be configured (or designed, allocated) in the following scheme in order to distinguish all cell identifiers (e.g., 504 cell identifiers, 1008 cell identifiers). Hereinafter, for convenience of the description, it is assumed that the total number of cell identifiers is configured to 504 which is the total number of cell identifiers in the existing LTE system. In this case, it is needless to say that the corresponding method may be similarly applied even to the case where the total number of cell identifiers of the NR system is different from the existing case (e.g., 1008).

For example, a total length 72 sequence may be used for the SSS sequence, but a length 67 sequence may first be generated in consideration of a guard region. That is, by considering the guard region, a sequence may be used, which has a shorter length than the frequency domain allocated to the SSS sequence may be used. Here, the total length 72 may also be used when the bandwidth is 1.04 MHz, the subcarrier spacing is 15 kHz and/or the bandwidth is 4.16 MHz and the subcarrier spacing is 60 kHz. In this case, the generated length 67 sequence may be a ZC sequence (Zadoff-Chu sequence), an M sequence (M sequence), or the like.

Thereafter, a length 68 sequence (e.g., a ZC sequence, an M sequence, etc.) may be generated by adding one sample to the generated length 67 sequence. For example, the length 68 sequence may be generated by adding (i.e., cyclically shifting) first one sample of the sequence to the end of the sequence. Alternatively, as another example, a method for generating the length 68 sequence by adding '0 (zero)' to an arbitrary digit may be considered. In this case, the method (that is, the method using the cyclic shift) of the first example may be more advantageous.

Thereafter, a sequence of total length 72 may be generated by adding two samples of '0' to be used for guarding at both ends of the generated length 68 sequence. In other words, the sequence used for the generation of the SSS sequence may be generated (or configured, designed) according to the length of the resource region allocated to the SSS sequence transmission. Hereinafter, in this specification, the sequence generated through the above procedures may be referred to as a first sequence.

When the generated length 72 sequence is the ZC sequence, a total of 67 root indexes may be used for the corresponding sequence. However, only 63 root indexes (e.g., 3, 4, 5, . . . , 63, 64, 65) out of 67 root indexes may be used in consideration of the Peak-to-Average Power Ratio (PAPR). Alternatively, when the generated length 72 sequence is based on an M sequence of length 68, the sequence may utilize a total of 68 cyclic shift values. Even in this case, only some cyclic shift values (e.g., 63 values) may be used in consideration of the PAPR and the correlation value.

In this case, a scrambling sequence to be applied to the sequence generated through the above-described procedures may be additionally considered. Here, the scrambling sequence may mean a sequence multiplied by a specific sequence. That is, in order to generate the SSS sequence, a method for multiplying the generated sequence by a sequence having the same length as the corresponding sequence may be considered. In this case, a product between the sequences may mean a product between each element (or sample) of the sequence corresponding to the same position. For example, when the first sequence is constituted by [0 1 1 1 0 . . . ] and the second sequence is constituted by [0 0 1 1 1 . . . ], a sequence generated by the product of the elements of two sequences is [0*0 1*0 1*1 1*1 0*1 . . . ].

In this case, the scrambling sequence may be a pseudo-random noise sequence (PN sequence), an M sequence, a Hadamard sequence, a binary sequence, or the like.

For example, when the PN sequence is used as the scrambling sequence, a method may be considered, in which a PN sequence of length 63 is generated with a scrambling sequence for a sequence of length 68 (e.g., a ZC sequence of length 68) as described above and then, a PN sequence of length 68 is generated by adding 5 samples. Even in this case, in the same scheme as described above, a method for adding 5 samples at the beginning of the sequence to the end of the sequence (i.e., cyclic shift) or generating the length 68 sequence by adding '0 (zero)' to an arbitrary digit five times may be considered.

In this case, in order for the scrambling sequences to have eight candidates, the sequence may be cyclically shifted using a specific starting sample value (or a specific initial value). Alternatively, a method of using eight different PN sequences by configuring different seed values for generating the PN sequence may also be considered. The two methods are different from each other in that in the former, the same (i.e., single) sequence is cyclically shifted and used in eight different forms and in the latter, eight different sequences are used.

Alternatively, as another example, when the M sequence is used as the scrambling sequence, a method for generating an M sequence of length 68 as the scrambling sequence for the length 68 sequence (e.g., a ZC sequence of length 68, an M sequence of length 68) described above may be considered. In this case, the eight candidates may be separated (or generated) by eight different cyclic shift values so that the scrambling sequences have eight candidates.

Thereafter, a sequence of total length 72 may be generated by adding two samples of '0' to be used for guarding at both ends of the generated length 68 sequence. Hereinafter, in this specification, the sequence generated through the above procedures may be referred to as a second sequence.

Through the procedures described above, two length 72 sequences, i.e., a specific sequence (i.e., the first sequence) and the scrambling sequence (i.e., the second sequence) for the specific sequence may be generated and the SSS sequence may be finally generated by scrambling two generated sequences. For example, the SSS sequence may be generated by scrambling the PN sequence of length 72 for the ZC sequence of length 72. Alternatively, as another example, the SSS sequence may be generated by scrambling another M sequence of length 72 for the M sequence of length 72.

In this case, when the number of candidates for the specific sequence (i.e., the first sequence) is configured to 63 and the number of candidates for the scrambling sequence (i.e., the second sequence) is configured to 8, a total of 63*8, i.e., 504 SSS sequence candidates may be separated (or distinguished). Accordingly, when the total number of cell identifiers is 504, the SSS sequences may be generated as many as all cell identifiers.

As mentioned above, it is needless to say that the above-described SSS sequence configuration (or generation)

scheme may be applied even if the number of cell identifiers is configured to a number other than 504. For example, when the number of cell identifiers is configured to 1008 in the NR system, 112 candidates for the first sequence may be configured and 9 candidates for the second sequence may be configured. In this case, the number of SSS sequence candidates that may be finally generated through the product (i.e., the product between the elements of the first sequence and the elements of the second sequence) between the first sequence and the second sequence is 1008. Further, in this case, as the sequence length for the synchronization signal becomes longer, the number of frequency domains allocated to the synchronization signal, that is, the number of RBs may be increased (e.g., 12 RBs).

In this case, the length of the first sequence and the length of the second sequence are configured to be equal to each other and the length of the first sequence and the length of the second sequence are equal to the length of the finally formed SSS sequence. That is, the actual sequence length excluding the guard region in the first sequence and the second sequence is equal to the length of the actual SSS sequence except for the guard region.

Further, in this regard, in the existing LTE system, interleaving two short sequences (e.g., length 31 sequences) to configure (or generate) the SSS sequence, while the SSS sequence proposed in this specification is configured based on a long sequence. Here, the long sequence may mean a sequence not generated by interleaving a plurality of sequences. Alternatively, the long sequence may mean a sequence (or some sequences configured to have a short length considering the guard region) configured in accordance with the resource region allocated to the SSS sequence. When the SSS sequence is generated (or configured) using the long sequence rather than the short sequence, the cross correlation performance between the sequences is enhanced, and as a result, a ghost effect in which the UE does not receive the SSS may be prevented.

Further, as described above, the number of candidates of the first sequence and the number of candidates of the second sequence may be configured to be uneven (i.e., the number of candidates of a part may be configured to be larger than the number of candidates of another part). When the number of candidates in the first sequence and the number of candidates in the second sequence are configured to be equal to each other, the cross correlation value between the SSS sequences generated using the first sequence and the second sequence may be large (e.g., 0.5). In contrast, when the number of candidates of the first sequence and the number of candidates of the second sequence are configured to be unequal, the cross correlation value between the generated SSS sequences is small (i.e., the cross correlation performance is good). Therefore, when the number of candidates of the first sequence is configured to be different from the number of the candidates of the second sequence, there is an advantage that the detection performance of the SSS sequence, that is, the SSS may be enhanced.

Further, when the first sequence and the second sequence are the M sequences, the PSS sequence may be generated based on a first polynomial used for generating the first sequence or a second polynomial used for generating the second sequence. In this case, as the polynomial for generating the PSS sequence is overlapped with any of the polynomials for generating the SSS sequence, the complexity for generating the sequence for the synchronization signal may be lowered.

Further, as the initial values and/or polynomials for generating the SSS sequence as described above, the values and/or equations of the synchronization signal related contents described above may be used.

Further, in order to distinguish a subframe index and/or a frame index using the SSS, a method for additionally applying another scrambling sequence (that is, a third sequence) to the SSS (i.e., SSS sequence) generated through the above-described procedures may also be considered. That is, the number of candidates may be increased by additionally applying another scrambling sequence and the subframe index and/or the frame index may be configured to be distinguished through a newly configured candidate.

Figure 8:
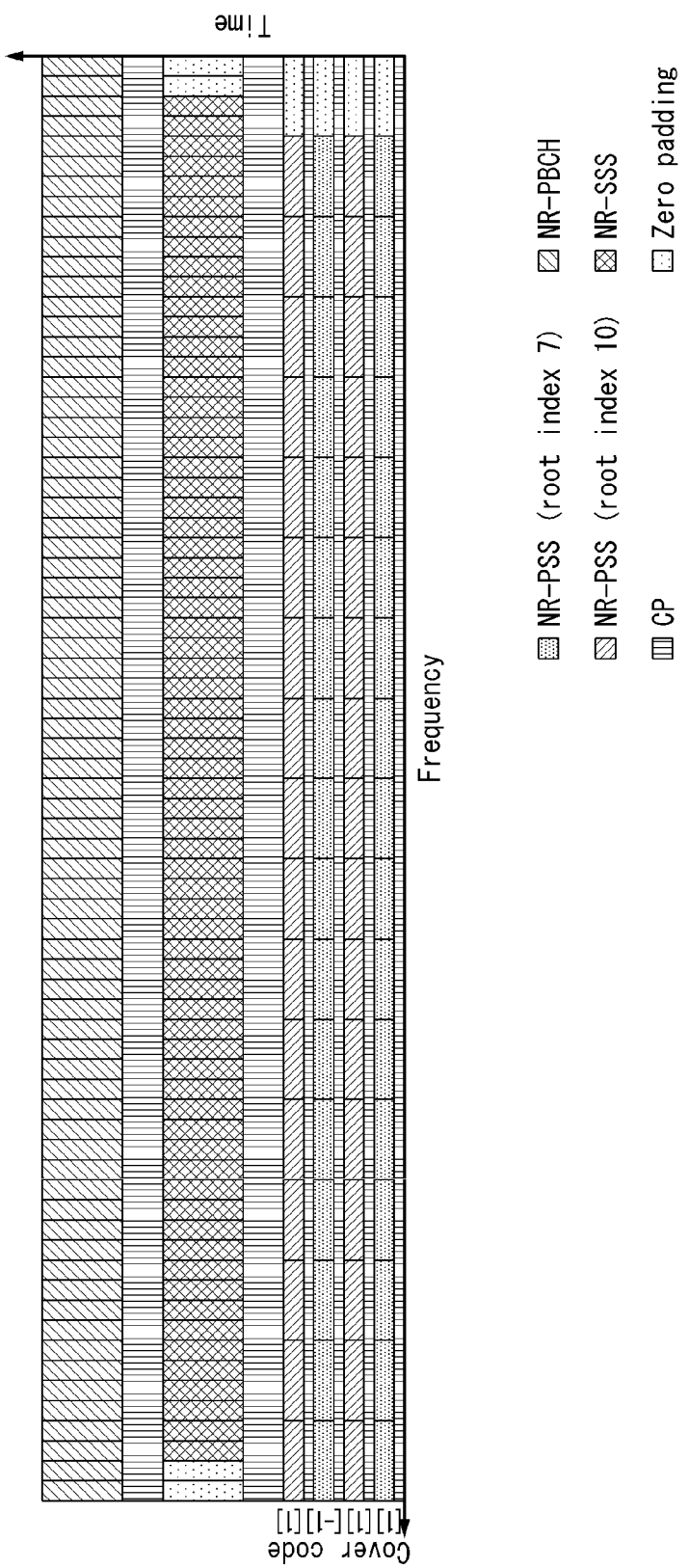
FIG. 8 illustrates yet another example of the method for transmitting the synchronization signal to which the method proposed in this specification may be applied.

FIG. 8 illustrates yet another example of the method for transmitting the synchronization signal to which the method proposed in this specification may be applied. FIG. 8 is merely for convenience of the description and does not limit the scope of the present invention.

Referring to FIG. 8, it is assumed that the subcarrier spacing applied to the PSS is configured to be four times larger than the subcarrier spacing applied to the SSS, and the subcarrier spacing applied to the PBCH is configured to be equal to the subcarrier spacing applied to the SSS. It is also assumed that two kinds of ZC sequences (ZC sequence of root index 7 and ZC sequence of root index 10) with different root indexes are used for PSS transmission. For example, two ZC sequences with length 17 using different root indexes are used for transmission of the PSS.

In this case, the PSS is transmitted through four ZC sequences with length 17 in which the ZC sequence corresponding to each root index is repeated twice.

In this case, a transmission bandwidth of the PSS is configured the same as the transmission bandwidth of the SSS, and a cover code of [1, 1, −1, 1] may be applied to the PSS, i.e., four ZC sequences with length 17. In addition, zero padding for a guard region may be performed at one end of the PSS and at both ends of the SSS. In this case, the PSS is transmitted through four symbols (in this case, the time duration corresponding to all four symbols is the same as one symbol duration configured according to the subcarrier duration of the SSS). Further, as illustrated in FIG. 8, the root index used in the PSS sequence may be allocated to [7, 10, 7, 10].

Further, in this case, as illustrated in FIG. 8, a CP length for SSS transmission and a CP length for PBCH transmission may be configured to be the same as each other. In addition, the length of the substantial SSS sequence may be configured to be smaller than the length of the PBCH sequence (i.e., the sequence used for PBCH transmission).

Further, in the above-described SSS sequence generation (or configuration) scheme, a default subcarrier spacing value is configured to 15 kHz. However, this is only an example for convenience of description, and the default subcarrier spacing may be 30 kHz, 60 kHz, etc. in a band of 6 GHz or less, and may be 120 kHz, 240 kHz, etc. as well as 60 kHz in a band of 6 GHz or more. Thus, based on the default subcarrier spacing value, the subcarrier spacing value used for the PSS and/or SSS may be scaled to be larger or smaller according to the methods described above.

Further, in various embodiments of the present invention, like Method 1 and Method 2 described above, the following PSS sequence configuring and/or allocating method may be considered when the same subcarrier spacing is configured for the PSS and the SSS. Hereinafter, for convenience of description, it is assumed that the subcarrier spacings applied to the PSS and the SSS are 15 kHz.

For example, a method of transmitting a PSS sequence (i.e., a sequence for PSS) by frequency division multiplexing (FDM) four ZC symbols with length 17 using different root indexes into one symbol may be considered. As another example, a method of transmitting a PSS sequence by FDM of one ZC sequence with length 17 using the same root index to one symbol may be considered. In another example, a method of generating two ZC sequences (i.e., a first sequence A, a second sequence B) with length 17 using different root indexes and transmitting a PSS sequence by FDM of the two sequences generated in various combinations such as ABAB, AABB, and ABBA through four symbols may be considered.

In the above examples, it is advantageous to apply a cover code for each ZC sequence(s) to improve correlation performance.

In this case, the above-described PSS may have one or three sequence candidates for detecting a cell identifier. When there are three PSS sequence candidates, different root indexes need to be configured according to the above-described method for each candidate. On the other hand, when there is one PSS sequence candidate, the SSS sequence may be generated (or configured) based on a scheme (that is, a scheme in which the total number of candidates of the SSS sequence is configured to be equal to the total number of cell identifiers) for identifying all cell identifiers.

Figure 9:
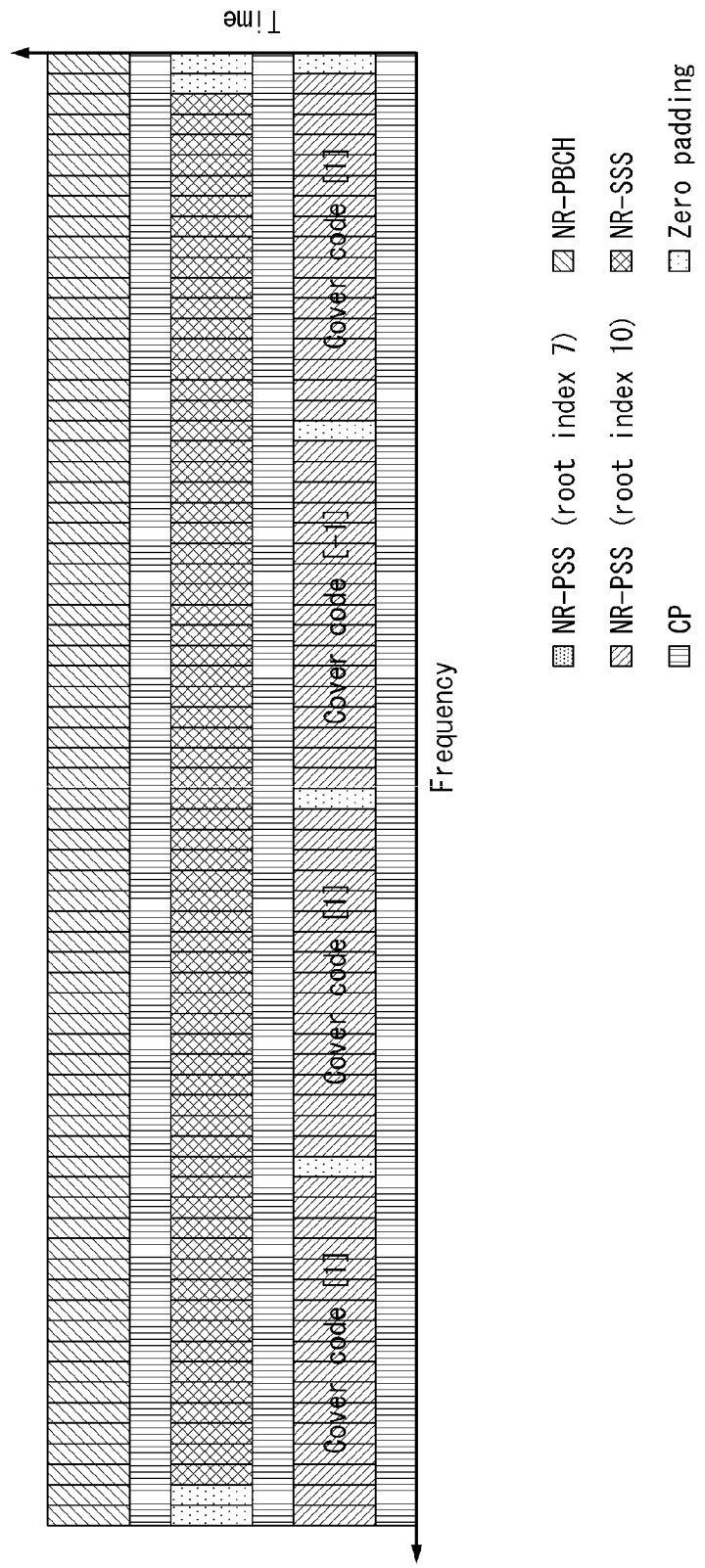
FIG. 9 illustrates still yet another example of the method for transmitting the synchronization signal to which the method proposed in this specification may be applied.

FIG. 9 illustrates still yet another example of the method for transmitting the synchronization signal to which the method proposed in this specification may be applied. FIG. 9 is just for convenience of the description and does not limit the scope of the present invention.

Referring to FIG. 9, it is assumed that two kinds of ZC sequences (ZC sequence of root index 7 and ZC sequence of root index 10) with different root indexes are used for PSS transmission. Here, the length of the ZC sequence is configured to 17.

Four ZC sequences (that is, two are used for one kind of ZC sequence) is mapped to a resource region through the FDM method as described above. In this case, the cover code [1, 1, −1, 1] may be applied to the PSS, i.e., four ZC sequences. In addition, zero padding for a guard region may be performed at one end of the PSS and at both ends of the SSS. Further, as illustrated in FIG. 9, the root index for FDM sequences with length 17 may be configured to [7, 10, 7, 10].

Further, with respect to the PSS sequence as described above, the root index (i.e., the root index for generation of ZC sequences) for the ZC sequences may be selected to have a complex conjugate relation between the generated ZC sequences. That is, when the length of the ZC sequence is $N_{ZC}$, the ZC sequence can be selected by a combination of $(N_{ZC}-1)/2-m$ and $(N_{ZC}-1)/2+m+1$. Here, m means an integer larger than 0 and smaller than $(N_{ZC}-1)/2$, including 0. Such a route index selection method may be applied regardless of a duplex mode of the PSS design.

Further, in FIG. 8 described above, with respect to the PSS, a down-scaled CP is configured for each OFDM symbol having a subcarrier spacing of 60 kHz. Unlike this (that is, the down-scaled CP is not attached to each OFDM symbol), a method of generating one CP (i.e., a single CP) corresponding to the CP length used for an OFDM symbol with a subcarrier spacing of 15 kHz and attaching (or configuring) the generated one CP to the front portion of the four OFDM symbols may be considered. An example thereof is illustrated in FIG. 10.

Figure 10:
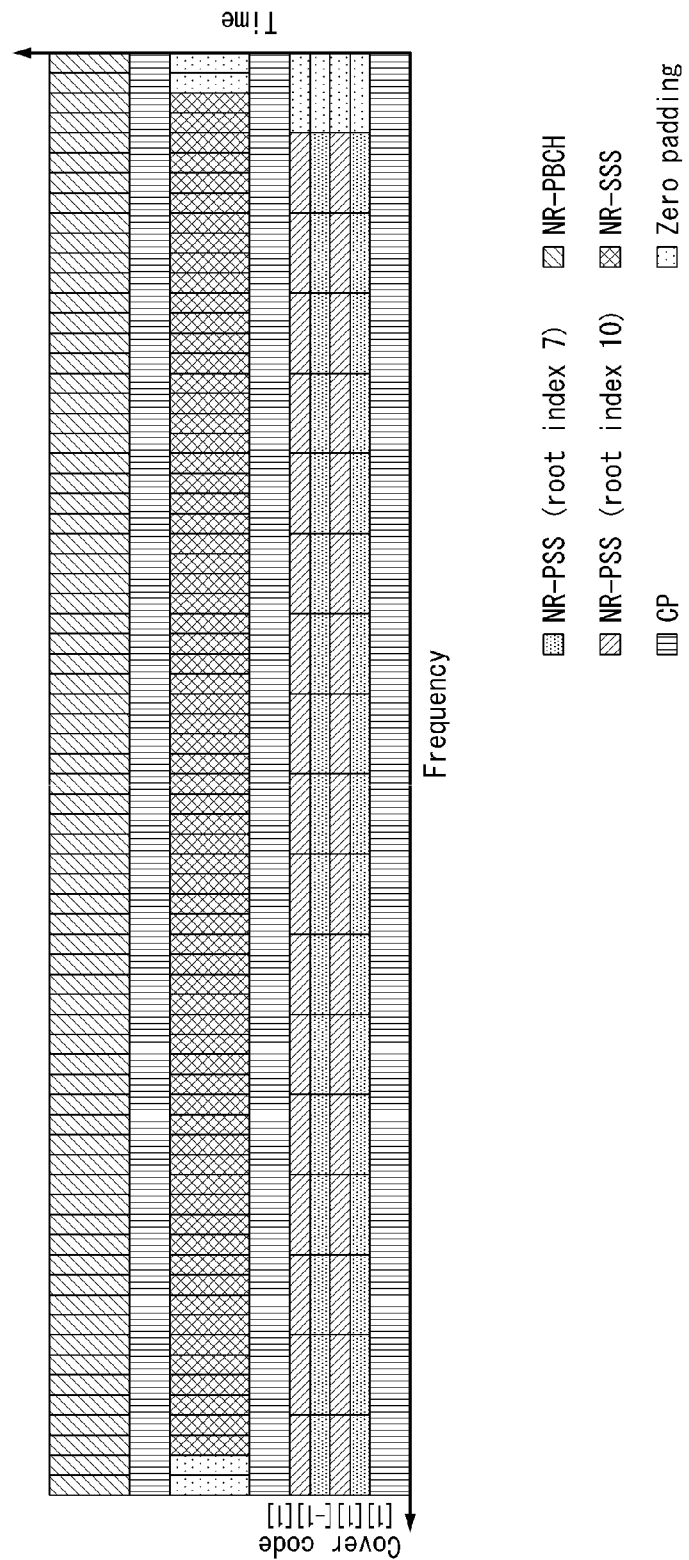
FIG. 10 illustrates still yet another example of the method for transmitting the synchronization signal to which the method proposed in this specification may be applied.

FIG. 10 illustrates still yet another example of the method for transmitting the synchronization signal to which the method proposed in this specification may be applied. FIG. 10 is merely for convenience of explanation and does not limit the scope of the present invention.

Referring to FIG. 10, it is assumed that two kinds of ZC sequences (ZC sequence of root index 7 and ZC sequence of root index 10) with different root indexes are used for PSS transmission. Here, the length of the ZC sequence is configured to 17.

In this case, the PSS is transmitted through four symbols corresponding to a subcarrier spacing of 60 kHz, and in this case, no CP period is allocated between the four symbols. Instead, a CP corresponding to the subcarrier spacing of 15 kHz is located in front portion of four consecutive symbols.

Through such arrangement (i.e., arrangement in which the CP length and the location are matched to those of the default subcarrier spacing), it is advantageous to support multiplexing with a data signal transmitted in another band in which the PSS is not transmitted. Here, the PSS is configured to use a subcarrier spacing (e.g., a subcarrier spacing of 60 kHz) corresponding to N times (for example, N=4) of the default subcarrier spacing, and the data signal may be configured to use a default subcarrier spacing (for example, 15 kHz).

In addition, the method of generating the above-described model may be described as follows. That is, in the case where the CP length corresponding to the default subcarrier spacing is used for the synchronization signal (e.g., PSS) using the subcarrier spacing corresponding to N times the default subcarrier spacing, the synchronization signal configuration (or a synchronization signal mapping method) may also be performed as illustrated in the following example. In this case, it is assumed that first N OFDM symbols are repeatedly configured.

For example, for a single OFDM symbol configured at the default subcarrier spacing (e.g., 15 kHz), a comb type symbol may be generated by mapping information is mapped to every N REs based on a frequency domain and inserting 0 to the remaining N−1 REs. Thereafter, a time domain sequence of $N_{IFFT}/N$ length may be generated (obtained) by dividing a time domain sequence generated by performing inverse fast Fourier transform (IFFT) with an $N_{IFFT}$ size into N equal parts.

In this case, as illustrated in FIG. 9, in order to obtain the same effect as using the root index value having a complex conjugate relation, in a region of the first $N_{IFFT}/N$ length (i.e., the first symbol of the N OFDM symbols), the N-divided time domain sequence is inserted, and in a next region of $N_{IFFT}/N$ length, a time domain sequence configured as the complex conjugate value of the N-divided domain sequence may be inserted. The above operation is repeated until the length becomes $N_{IFFT}$, so that a final time domain sequence may be generated. That is, finally, the above-described operation may be repeated until a time-domain sequence of the $N_{IFFT}/N$ length is generated.

Thereafter, by inserting (attaching) one (i.e., single) CP corresponding to the CP length used in the OFDM symbol having the default subcarrier spacing to the front part of the symbols to which the corresponding time domain sequence is mapped, the final time domain OFDM symbol (i.e., the final time domain OFDM symbol structure) may be completed.

Substituting a specific number for the above example is as follows. When 1.08 MHz is used as the transmission bandwidth of the synchronization signal and 4 repetitions are considered for 72 REs, a ZC sequence with length 17 is inserted to every 4 REs and '0' may be inserted to the remaining three REs. Here, length 17 may mean a length corresponding to the largest odd number among the numbers smaller than or equal to a value (i.e., 18) obtained by dividing 72 by 4.

Thereafter, IFFT is performed with 512 IFFT sizes, and a time domain sequence with length 128 may be obtained by dividing length 512 into 4 equal parts. Thereafter, the four-divided time domain sequence is inserted to the first 128-length region (i.e., the first region where a 128-length time domain sequence may be mapped, that is, the first OFDM symbol of 4 OFDM symbols), and a time domain sequence configured as the complex conjugate value of the four-divided time domain sequence may be inserted to a next region. By repeating such an operation twice more, a time domain sequence of a total length of 512 may be generated. Thereafter, a final time domain OFDM symbol may be completed by inserting a CP with length 40 or 36.

Alternatively, as another example, for an OFDM symbol using a subcarrier spacing scaled by N times of the default subcarrier spacing (e.g., 15 kHz), a method of generating the above-described model by inserting data to each RE based on a frequency domain may be considered. After the data is inserted to each RE, a time domain sequence with a length of $N_{IFFT}/N$ may be generated (obtained) by performing inverse fast Fourier transform (IFFT) with an $N_{IFFT}/N$ size.

In this case, as illustrated in FIG. 9 above, in order to obtain the same effect as using the root index value having a complex conjugate relation, in a region of the first $N_{IFFT}/N$ length, the generated (i.e., first generated) time domain sequence is inserted, and in a next region of $N_{IFFT}/N$ length, a time domain sequence configured as the complex conjugate value of the generated time domain sequence may be inserted. The above operation is repeated until the length becomes $N_{IFFT}$, so that a final time domain sequence may be generated. That is, finally, the above-described operation may be repeated until a time domain sequence of the $N_{IFFT}/N$ length is generated.

Thereafter, by inserting one CP corresponding to the CP length used in the OFDM symbol having the default subcarrier spacing to the front part of the symbols to which the corresponding time domain sequence is mapped, the final time domain OFDM symbol (i.e., the final time domain OFDM symbol structure) may be completed.

Substituting a specific number for the above example is as follows. When 1.08 MHz is considered as the transmission bandwidth of the synchronization signal, a ZC sequence configured with length 17 is inserted (or mapped) to 18 REs and '0' may be inserted to the remaining one RE. In this case, it is assumed that 17 is selected as the odd length.

Thereafter, an IFFT is performed with a 128 IFFT size, so that a 128-length time domain sequence may be obtained. Thereafter, the generated time domain sequence is directly inserted into the first 128-length region (i.e., the first region in which a 128-length time domain sequence may be mapped), and a time domain sequence configured with the complex conjugate value of the generated sequence may be inserted to a next region thereof. By repeating such an operation twice more, a time domain sequence of a total length of 512 may be generated. Thereafter, a final time domain OFDM symbol may be completed by inserting a CP with length 40 or 36.

Further, the cover code used in the methods proposed in this specification may be configured in the same form as in the case of not applying the cover code such as [1, 1, 1, 1].

In addition, in the methods proposed in this specification, by assuming a case where the sync bandwidth (i.e., a transmission bandwidth for a synchronous signal) is about 1 MHz (i.e., 1.08 MHz), a length (i.e., a length of a sequence) is configured. However, this is just for convenience of explanation, and it is natural that even if the sync bandwidth increases to K MHz, the above-described methods may be applied by extending (that is, scalably adjusting) the length of the sequence by L times. For example, even when the sync bandwidth is configured to about 5 MHz (e.g., 4.32 MHz), the length of the sequence is configured to be 4 times longer (i.e., 4.32/1.08=4 times), and thus the methods proposed in this specification may be applied in the same manner.

Further, the methods proposed in this specification may be applied not only below 6 GHz band but also above 6 GHz band (e.g., 30 GHz, 40 GHz, etc.). In addition, a default numerology may be represented by a reference numerology, a numerology used in a specific frequency band, and the like. In addition, even if the default numerology is changed, the length of the sequence is constant and has a scalable transmission bandwidth in accordance with the subcarrier spacing.

Figure 11:
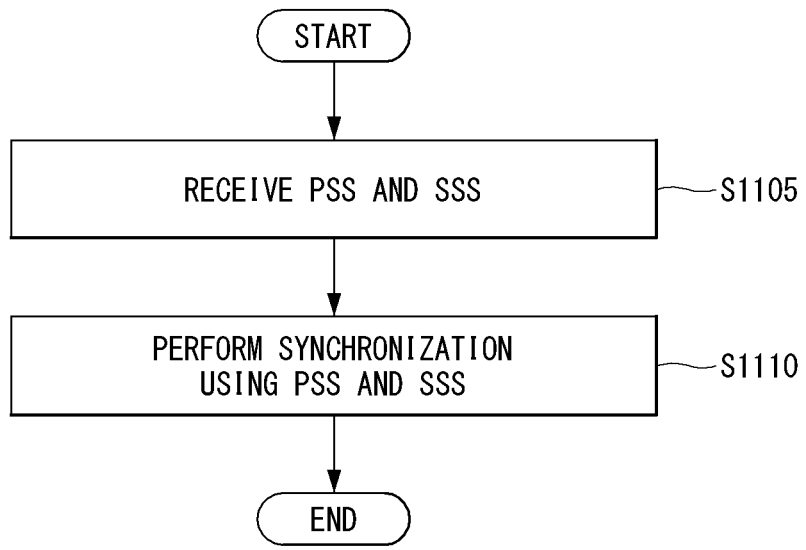
FIG. 11 illustrates an operation flowchart of a user equipment which performs synchronization through transmission and reception of a synchronization signal to which a method proposed in this specification may be applied.

FIG. 11 illustrates an operation flowchart of a user equipment which performs synchronization through transmission and reception of a synchronization signal to which a method proposed in this specification may be applied. FIG. 11 is merely for convenience of the description and does not limit the scope of the present invention.

Referring to FIG. 11, it is assumed that the UE monitors a synchronization signal at a pre-configured bandwidth with respect to a synchronization signal.

In step S1105, the UE receives a PSS and an SSS from the base station. In this case, the PSS and the SSS may be received by the method described above. That is, the UE receives the PSS and the SSS using resource elements to which the sequence (i.e., the PSS sequence described above) for the PSS is mapped and resource elements to which the sequence (i.e., the SSS sequence described above) for the SSS is mapped. In this case, the sequence for the PSS and the sequence for the SSS may be generated (or configured) according to the above-described method(s).

In this case, the sequence for the SSS is generated by a product between a first sequence and a second sequence. Here, the number (i.e., the number of candidates of the first sequence that may be used for generating the SSS sequence) of the first sequences is larger than the number (i.e., the number of candidates of the second sequence that may be used for generating the SSS sequence) of the second sequences.

In addition, the number (i.e., the number of generable SSS sequences, the number of candidates of the SSS sequences) of sequences for the SSS may be configured to be equal to the number (e.g., 1008) of cell identifiers (e.g., physical layer cell identifiers). In this case, the number of the cell identifiers may be configured to be equal to the product of the number of the first sequences and the number of the second sequences.

In addition, the product between the first sequence and the second sequence may be a product between each element of the first sequence and each element of the second sequence, as described above.

Further, as described above, the length of the first sequence and the length of the second sequence may be the same as the length of the sequence for the SSS, respectively. That is, the SSS sequence may be generated by a product of two sequences (i.e., a long sequence) having the same length as the SSS sequence. In this case, any one of the first sequence and the second sequence may be an M sequence (m sequence). In this case, the M sequence may be generated based on a specific initial value (e.g., [0 0 0 0 0 0 1]) and a specific cyclic shift. That is, the M sequence may be generated using a polynomial having a specific initial value and a cyclic shift satisfying a predetermined condition.

In addition, the polynomial for the sequence for the PSS may be configured to be equal to either a first polynomial for the first sequence or a second polynomial for the second sequence. For example, when the polynomials for generating the SSS sequence are represented by $x_0(n)$ and $x_1(n)$, and the polynomial for generating the PSS sequence is represented by $x(n)$, $x(n)$ may be configured to be equal to $x_0(n)$. However, even in this case, as described above, the initial values of the polynomials may be configured to be different from each other.

Further, as illustrated in FIG. 8, the SSS is received contiguously with a physical broadcast channel (PBCH), and the CP applied to the SSS and the CP applied to the PBCH may be configured to be the same as each other.

Overview of Devices to which Present Invention is Applicable

Figure 12:
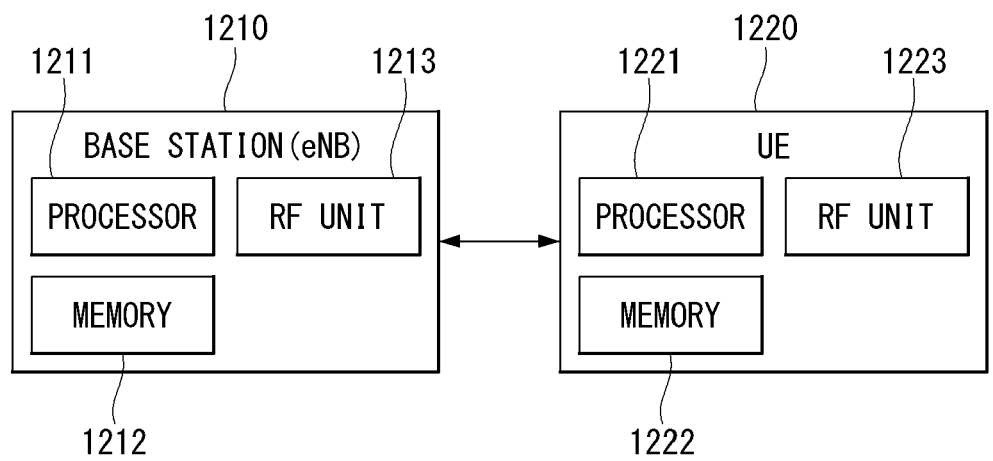
FIG. 12 illustrates a block diagram of a wireless communication device to which methods proposed in this specification may be applied.

FIG. 12 illustrates a block diagram of a wireless communication device to which methods proposed in this specification may be applied.

Referring to FIG. 12, a wireless communication system includes a base station 1210 and multiple UEs 1210 positioned within an area of the base station 1220.

The base station 1210 includes a processor 1211, a memory 1212, and a radio frequency (RF) unit 1213. The processor 1211 implements a function, a process, and/or a method which are proposed in FIGS. 1 to 11 above. The layers of the wireless interface protocol may be implemented by the processor 1211. The memory 1212 is connected with the processor 1211 to store various pieces of information for driving the processor 1211. The RF unit 1213 is connected with the processor 1211 to transmit and/or receive a radio signal.

The UE 1220 includes a processor 1221, a memory 1222, and an RF unit 1223.

The processor 1221 implements a function, a process, and/or a method which are proposed in FIGS. 1 to 11 above. The layers of the wireless interface protocol may be implemented by the processor 1221. The memory 1222 is connected with the processor 1221 to store various pieces of information for driving the processor 1221. The RF unit 1223 is connected with the processor 1221 to transmit and/or receive a radio signal.

The memories 1212 and 1222 may be positioned inside or outside the processors 1211 and 1221 and connected with the processors 1211 and 1221 by various well-known means.

As an example, in a wireless communication system supporting a low latency service, the UE may include a radio frequency (RF) unit for transmitting and receiving a radio signal and a processor functionally connected with the RF unit in order to transmit and receive downlink (DL) data.

Further, the base station 1210 and/or the UE 1220 may have a single antenna or multiple antennas.

Figure 13:
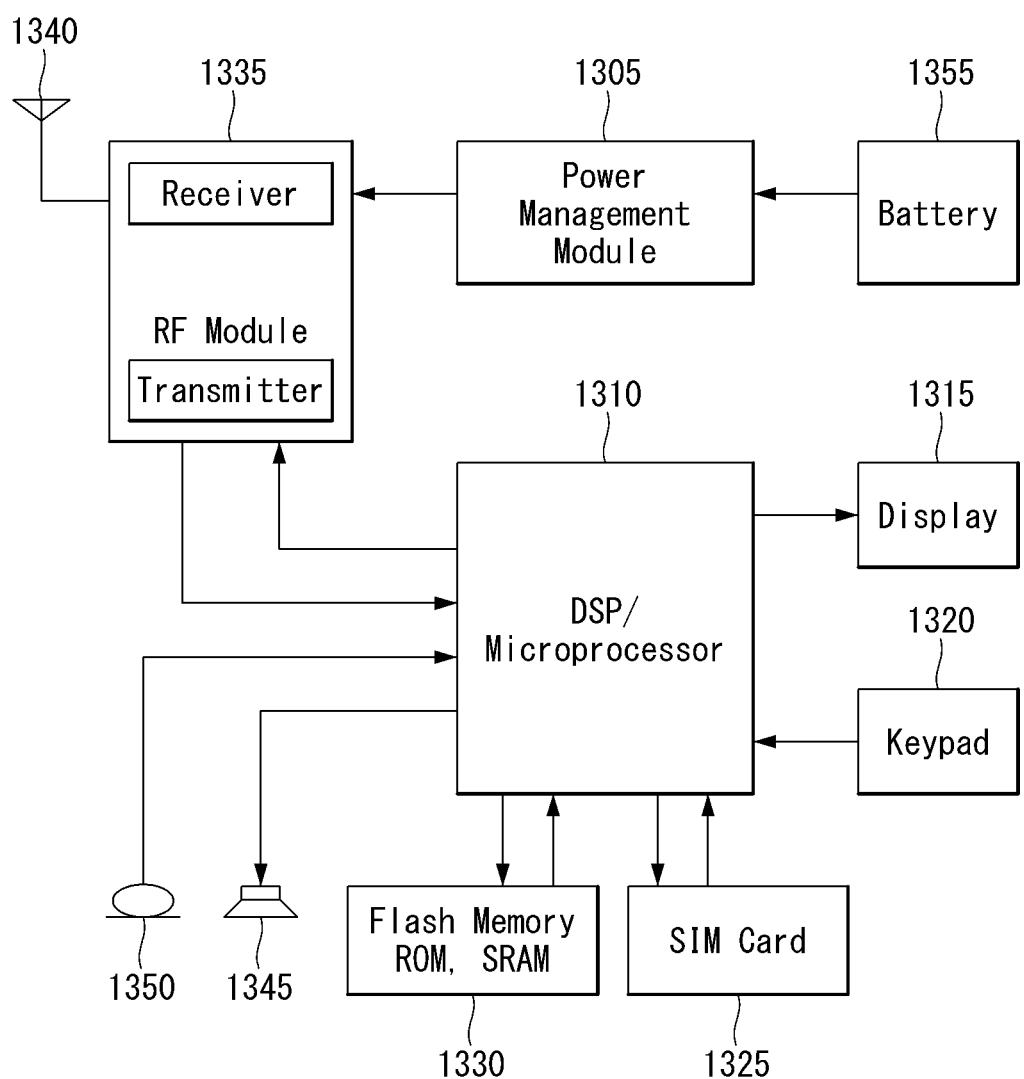
FIG. 13 illustrates a block diagram of a communication device according to an embodiment of the present invention.

FIG. 13 illustrates a block diagram of a communication device according to an embodiment of the present invention.

In particular, FIG. 13 is a diagram more specifically illustrating the UE of FIG. 8 above.

Referring to FIG. 13, the UE may be configured to include a processor (or a digital signal processor (DSP)) 1310, an RF module (or RF unit) 1335, a power management module 1305, an antenna 1340, a battery 1355, a display 1315, a keypad 1320, a memory 1330, a subscriber identification module (SIM) card 1325 (this component is optional), a speaker 1345, and a microphone 1350. The UE may also include a single antenna or multiple antennas.

The processor 1310 implements a function, a process, and/or a method which are proposed in FIGS. 1 to 11 above. Layers of a wireless interface protocol may be implemented by the processor 1310.

The memory 1330 is connected with the processor 1310 to store information related to an operation of the processor 1310. The memory 1330 may be positioned inside or outside the processor 1310 and connected with the processor 1310 by various well-known means.

A user inputs command information such as a telephone number or the like by, for example, pressing (or touching) a button on the keypad 1320 or by voice activation using the microphone 1350. The processor 1310 receives such command information and processes to perform appropriate functions including dialing a telephone number. Operational data may be extracted from the SIM card 1325 or the memory 1330. In addition, the processor 1310 may display command information or drive information on the display 1315 for the user to recognize and for convenience.

The RF module 1335 is connected with the processor 1310 to transmit and/or receive an RF signal. The processor 1310 transfers the command information to the RF module 1335 to initiate communication, for example, to transmit radio signals constituting voice communication data. The RF module 1335 is constituted by a receiver and a transmitter for receiving and transmitting the radio signals. The antenna 1340 functions to transmit and receive the radio signals. Upon receiving the radio signals, the RF module 1335 may transfer the signal for processing by the processor 1310 and convert the signal to a baseband. The processed signal may be converted into to audible or readable information output via the speaker 1345.

The aforementioned embodiments are achieved by a combination of structural elements and features of the present disclosure in a predetermined manner. Each of the structural elements or features should be considered selectively unless specified separately. Each of the structural elements or features may be carried out without being combined with other structural elements or features. In addition, some structural elements and/or features may be combined with one another to constitute the embodiments of the present disclosure. The order of operations described in the embodiments of the present disclosure may be changed. Some structural elements or features of one embodiment may be included in another embodiment, or may be replaced with corresponding structural elements or features of another embodiment. Moreover, it is apparent that some claims referring to specific claims may be combined with another claims referring to the other claims other than the specific claims to constitute the embodiment or add new claims by means of amendment after the application is filed.

The embodiments of the present disclosure may be achieved by various means, for example, hardware, firmware, software, or a combination thereof. In a hardware configuration, the methods according to the embodiments of the present disclosure may be achieved by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, microcontrollers, microprocessors, etc.

In a firmware or software configuration, the embodiments of the present disclosure may be implemented in the form of a module, a procedure, a function, etc. Software code may be stored in the memory and executed by the processor. The memory may be located at the interior or exterior of the processor and may transmit data to and receive data from the processor via various known means.

It will be apparent to those skilled in the art that various modifications and variations can be made in the present disclosure without departing from the spirit or scope of the inventions. Thus, it is intended that the present disclosure covers the modifications and variations of this invention provided they come within the scope of the appended claims and their equivalents.

Although a scheme of transmitting and receiving a synchronization signal in a wireless communication system of the present invention has been described with reference to an example applied to a 3GPP LTE/LTE-A system or a 5G system (New RAT system), the scheme may be applied to various wireless communication systems in addition to the 3GPP LTE/LTE-A system or 5G system.

What is claimed is:

1. A method of transmitting a synchronization signal by a base station in a wireless communication system, the method comprising:
   determining a sequence for a primary synchronization signal (PSS);
   determining a sequence for a secondary synchronization signal (SSS); and
   transmitting, to a user equipment (UE), the PSS and the SSS based on the sequence for the PSS and the sequence for the SSS,
   wherein the sequence for the SSS is generated based on a product of a first sequence and a second sequence,
   wherein a length of the sequence for the SSS is configured to be equal to a length of the first sequence and a length of the second sequence,
   wherein a number of candidates of the first sequence is configured to be larger than a number of candidates of the second sequence, wherein a product of the number of candidates of the first sequence and the number of candidates of the second sequence is identical to a number of cell identifiers supported by the wireless communication system,
   wherein a subcarrier spacing for the PSS and a subcarrier spacing for the SSS are based on any one of a plurality of subcarrier spacings supported by the wireless communication system, and
   wherein a subcarrier spacing for a Physical Broadcast channel (PBCH) that is related to the PSS and the SSS is configured to be equal to the subcarrier spacing for the PSS and the subcarrier spacing of the SSS.

2. The method of claim 1, wherein the product of the first sequence and the second sequence comprises pairwise products of elements of the first sequence and the second sequence.

3. The method of claim 1, wherein any one of the first sequence and the second sequence is an M sequence.

4. The method of claim 3, wherein the M sequence is generated based on a specific initial value and a specific cyclic shift.

5. The method of claim 1, wherein a polynomial for the sequence for the PSS is configured to be equal to any one of a first polynomial for the first sequence and a second polynomial for the second sequence.

6. The method of claim 5, wherein:
   based on the polynomial for the sequence for the PSS being $x(n)$: $x(0)$ is 0, $x(1)$ is 1, $x(2)$ is 1, $x(3)$ is 0, $x(4)$ is 1, $x(5)$ is 1, and $x(6)$ is 1,
   based on the first polynomial being $x_0(n)$: $x_0(0)$ is 1, $x_0(1)$ is 0, $x_0(2)$ is 0, $x_0(3)$ is 0, $x_0(4)$ is 0, $x_0(5)$ is 0, and $x_0(6)$ is 0, and
   based on the second polynomial being $x_1(n)$: $x_1(0)$ is 1, $x_1(1)$ is 0, $x_1(2)$ is 0, $x_1(3)$ is 0, $x_1(4)$ is 0, $x_1(5)$ is 0, and $x_1(6)$ is 0.

7. The method of claim 1, wherein a symbol in which the SSS is transmitted is contiguous in time to a symbol in which the PBCH is transmitted.

8. A base station configured to transmit a synchronization signal in a wireless communication system, the base station comprising:
   at least one transceiver;
   at least one processor; and
   at least one computer memory operably connected to the at least one processor and storing instructions that, based on being executed by the at least one processor, perform operations comprising:
   determining a sequence for a primary synchronization signal (PSS);
   determining a sequence for a secondary synchronization signal (SSS); and
   transmitting, to a user equipment (UE) via the at least one transceiver, the PSS and the SSS based on the sequence for the PSS and the sequence for the SSS,
   wherein the sequence for the SSS is generated based on a product of a first sequence and a second sequence,
   wherein a length of the sequence for the SSS is configured to be equal to a length of the first sequence and a length of the second sequence,
   wherein a number of candidates of the first sequence is configured to be larger than a number of candidates of the second sequence, wherein a product of the number of candidates of the first sequence and the number of candidates of the second sequence is identical to a number of cell identifiers supported by the wireless communication system,
   wherein a subcarrier spacing for the PSS and a subcarrier spacing for the SSS are based on any one of a plurality of subcarrier spacings supported by the wireless communication system, and
   wherein a subcarrier spacing for a Physical Broadcast channel (PBCH) that is related to the PSS and the SSS is configured to be equal to the subcarrier spacing for the PSS and the subcarrier spacing of the SSS.

9. The base station of claim 8, wherein the product of the first sequence and the second sequence comprises pairwise products of elements of the first sequence and the second sequence.

10. The base station of claim 8, wherein any one of the first sequence and the second sequence is an M sequence.

11. The base station of claim 10, wherein the M sequence is generated based on a specific initial value and a specific cyclic shift.

12. The base station of claim 8, wherein a polynomial for the sequence for the PSS is configured to be equal to any one of a first polynomial for the first sequence and a second polynomial for the second sequence.

13. The base station of claim 12, wherein:
   based on the polynomial for the sequence for the PSS being $x(n)$: $x(0)$ is 0, $x(1)$ is 1, $x(2)$ is 1, $x(3)$ is 0, $x(4)$ is 1, $x(5)$ is 1, and $x(6)$ is 1,
   based on the first polynomial being $x_0(n)$: $x_0(0)$ is 1, $x_0(1)$ is 0, $x_0(2)$ is 0, $x_0(3)$ is 0, $x_0(4)$ is 0, $x_0(5)$ is 0, and $x_0(6)$ is 0, and
   based on the second polynomial being $x_1(n)$: $x_1(0)$ is 1, $x_1(1)$ is 0, $x_1(2)$ is 0, $x_1(3)$ is 0, $x_1(4)$ is 0, $x_1(5)$ is 0, and $x_1(6)$ is 0.

14. The base station of claim 8, wherein a symbol in which the SSS is transmitted is contiguous in time to a symbol in which the PBCH is transmitted.

15. A processing device configured to control a base station to transmit a synchronization signal in a wireless communication system, the processing device comprising:
- at least one processor; and
- at least one memory operably connected to the at least one processor and storing instructions that, based on being executed by the at least one processor, perform operations comprising:
  - determining a sequence for a primary synchronization signal (PSS);
  - determining a sequence for a secondary synchronization signal (SSS); and
  - transmitting, to a user equipment (UE), the PSS and the SSS based on the sequence for the PSS and the sequence for the SSS,
- wherein the sequence for the SSS is generated based on a product of a first sequence and a second sequence,
- wherein a length of the sequence for the SSS is configured to be equal to a length of the first sequence and a length of the second sequence,
- wherein a number of candidates of the first sequence is configured to be larger than a number of candidates of the second sequence, wherein a product of the number of candidates of the first sequence and the number of candidates of the second sequence is identical to a number of cell identifiers supported by the wireless communication system,
- wherein a subcarrier spacing for the PSS and a subcarrier spacing for the SSS are based on any one of a plurality of subcarrier spacings supported by the wireless communication system, and
- wherein a subcarrier spacing for a Physical Broadcast channel (PBCH) that is related to the PSS and the SSS is configured to be equal to the subcarrier spacing for the PSS and the subcarrier spacing of the SSS.

* * * * *